(12) United States Patent
Umetani et al.

(10) Patent No.: US 9,749,714 B2
(45) Date of Patent: Aug. 29, 2017

(54) INFORMATION NOTIFICATION APPARATUS AND INFORMATION DISPLAYING METHOD

(71) Applicant: Panasonic Corporation, Osaka (JP)

(72) Inventors: Hideo Umetani, Osaka (JP); Yuji Unagami, Osaka (JP); Michiko Sasagawa, Osaka (JP); Kazunori Isogai, Kyoto (JP); Motoji Ohmori, Osaka (JP)

(73) Assignee: PANASONIC INTELLECTUAL PROPERTY MANGEMENT CO., LTD., Osaka (JP)

( * ) Notice: Subject to any disclaimer, the term of this patent is extended or adjusted under 35 U.S.C. 154(b) by 413 days.

(21) Appl. No.: 14/348,677

(22) PCT Filed: Aug. 22, 2013

(86) PCT No.: PCT/JP2013/004968
§ 371 (c)(1),
(2) Date: Mar. 31, 2014

(87) PCT Pub. No.: WO2014/049948
PCT Pub. Date: Apr. 3, 2014

(65) Prior Publication Data
US 2015/0296276 A1    Oct. 15, 2015

Related U.S. Application Data

(60) Provisional application No. 61/706,880, filed on Sep. 28, 2012.

(51) Int. Cl.
*G08G 1/07*    (2006.01)
*B60Q 1/00*    (2006.01)
(Continued)

(52) U.S. Cl.
CPC .................................. *H04Q 9/00* (2013.01)

(58) Field of Classification Search
CPC ......... H04N 21/4122; H04N 21/43615; H04N 2201/0094
See application file for complete search history.

(56) References Cited

U.S. PATENT DOCUMENTS 7,136,709 B2 * 11/2006 Arling .................... G05B 15/02
  340/3.1
7,165,641 B2 *  1/2007 Kitamura ................. B60L 1/16
  180/206.2

(Continued)

FOREIGN PATENT DOCUMENTS

JP    2005-278045    10/2005
JP    2005-284535    10/2005
(Continued)

OTHER PUBLICATIONS

International Search Report issued Nov. 26, 2013 in International Application No. PCT/JP2013/004968.

*Primary Examiner* — Steven Lim
*Assistant Examiner* — Muhammad Adnan
(74) *Attorney, Agent, or Firm* — Wenderoth, Lind & Ponack, L.L.P.

(57) ABSTRACT

An information notification apparatus includes: a communication unit which receives first device information and first history information from a first device and then transmits notification; an information collection database which holds, based on the first device information received by the communication unit, the received first history information in association with the held first device information; a determination unit which determines need to transmit notification of the first device when information included in the first history information held in the information collection database satisfies a condition; a display device designation unit (Continued)

which designates, based on destination information and the received first device information, a display device on which notification of the first device is to be displayed; and a generation unit which generates notification when the determination unit determines need to transmit the notification of the first device, wherein the communication unit transmits the generated notification to the designated display device.

17 Claims, 37 Drawing Sheets

(51) Int. Cl.
*G08B 25/00* (2006.01)
*G05B 11/01* (2006.01)
*G08C 19/12* (2006.01)
*G06F 7/00* (2006.01)
*H04Q 9/00* (2006.01)

(56) References Cited

U.S. PATENT DOCUMENTS

| | | | | |
|---|---|---|---|---|
| 7,937,232 B1* | 5/2011 | Chow | ................... | G05B 21/02 |
| | | | | 702/125 |
| 2005/0270557 A1* | 12/2005 | Ookuma | ............ | G03G 15/502 |
| | | | | 358/1.13 |
| 2008/0065235 A1* | 3/2008 | Igoe | .................. | H04L 12/2809 |
| | | | | 700/1 |
| 2008/0256445 A1* | 10/2008 | Olch | ................... | G06F 19/3418 |
| | | | | 715/700 |
| 2010/0052843 A1* | 3/2010 | Cannistraro | ........... | G08C 17/00 |
| | | | | 340/3.32 |
| 2010/0203369 A1* | 8/2010 | Liang | ................. | B60L 11/1822 |
| | | | | 429/93 |
| 2012/0127524 A1* | 5/2012 | Hagiwara | ............. | G06F 3/1203 |
| | | | | 358/1.15 |
| 2012/0226736 A1* | 9/2012 | Falchuk | ................ | G06F 9/5061 |
| | | | | 709/203 |
| 2012/0254167 A1* | 10/2012 | Kamada | ................. | G06Q 10/06 |
| | | | | 707/736 |
| 2012/0271711 A1* | 10/2012 | Moshiri | ............. | H04N 21/4312 |
| | | | | 705/14.49 |
| 2013/0169232 A1* | 7/2013 | Middleton | ........... | G01R 31/362 |
| | | | | 320/134 |
| 2013/0185386 A1* | 7/2013 | Hashida | ............ | G06F 17/30241 |
| | | | | 709/217 |
| 2014/0062351 A1* | 3/2014 | Spelta | ................ | B60L 11/1801 |
| | | | | 318/139 |
| 2015/0013454 A1* | 1/2015 | Lee | .................... | B60R 25/1001 |
| | | | | 73/509 |

FOREIGN PATENT DOCUMENTS

| | | |
|---|---|---|
| JP | 2007-60622 | 3/2007 |
| JP | 2008-158794 | 7/2008 |
| JP | 2012-100429 | 5/2012 |
| WO | WO 0227616 A1 * 4/2002 | ........... G06N 99/005 |

* cited by examiner

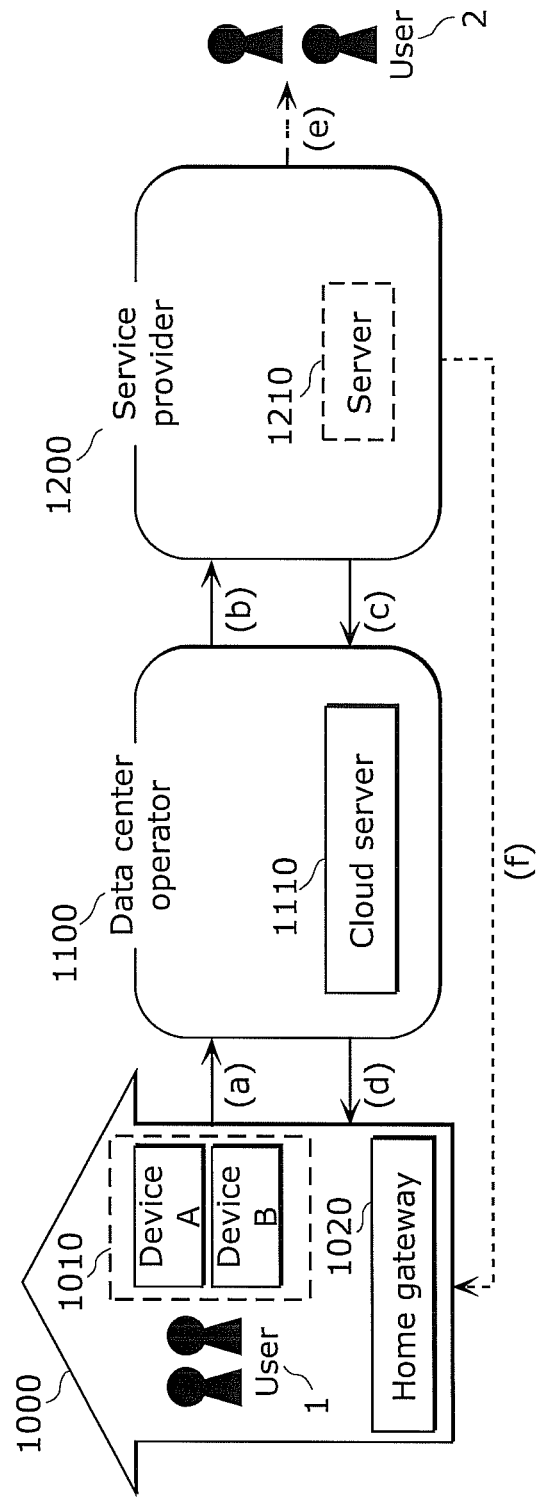

FIG. 6

- User A
  - Device A1 (Pedal cycle)
    2012/09/11
    11:55 Stop
          Remaining battery level 50%
          Consumed calorie 0 kcal
    ⋮
    12:00 Power ON
          Remaining battery level 50%
          Consumed calorie 0 kcal
    ⋮
    12:05 Driving
          Remaining battery level 49%
          Consumed calorie 10 kcal
    ⋮
    12:10 ...
  - Device A2 (Air conditioner)
    2012/09/01 11:55 Power OFF
          Today's use hours 1:30
          Eco navigation ratio
    ⋮
    12:00 Stop
          Today's use hours 1:30
    ⋮
  - Device A3 ...
- User B
  - Device B1 ...
  - Device B2 ...

FIG. 7

```
Device A (Pedal cycle)      - Display device 1 (Smartphone)
Device B (Air conditioner)  - Display device 2 (Television)
Device C                    - Display device 3
Device D                    - Display device 2
Device E                    - Display device 4
Device F                    - Display device 5
    ·                              ·
    ·                              ·
    ·                              ·
    ·                              ·
    ·                              ·
```

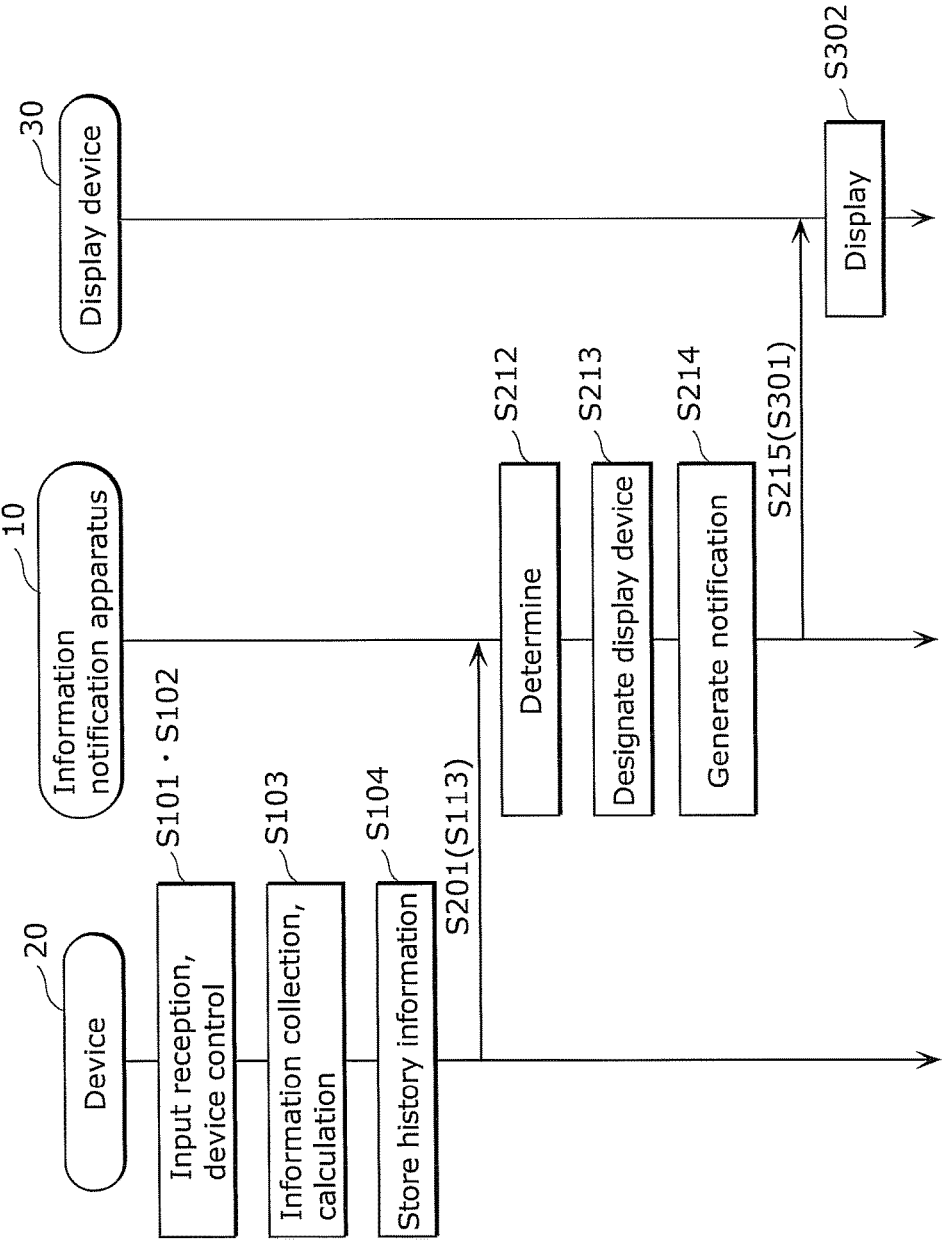

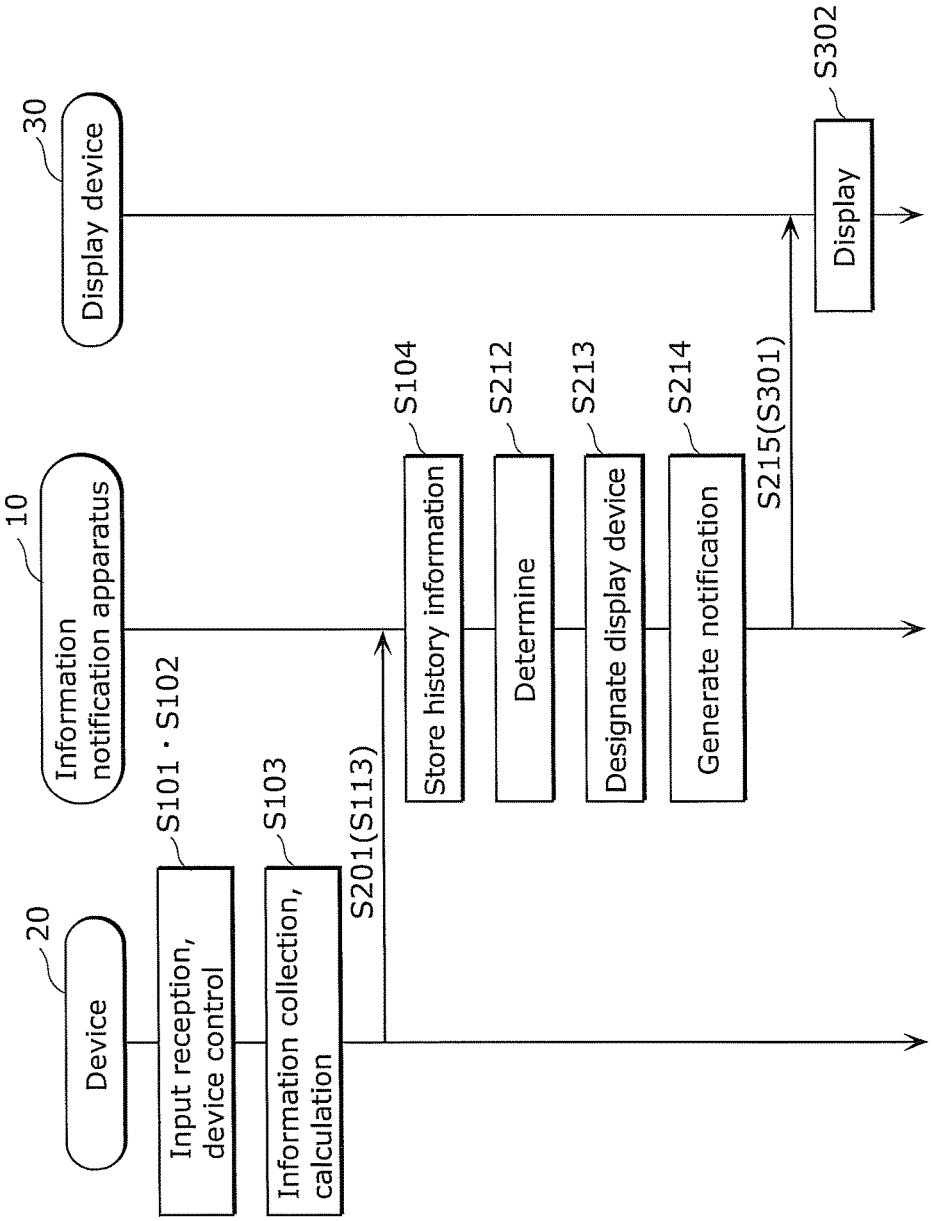

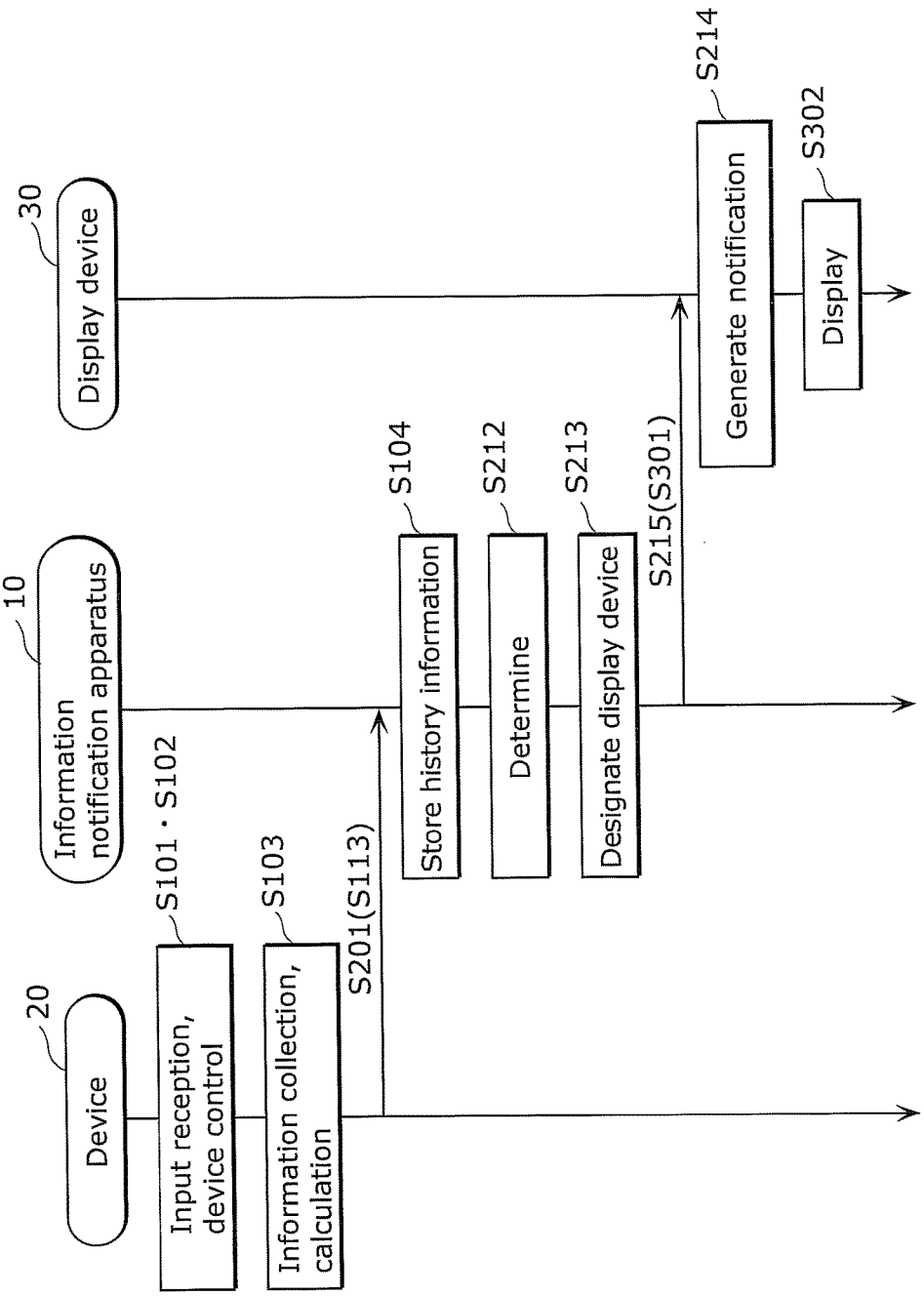

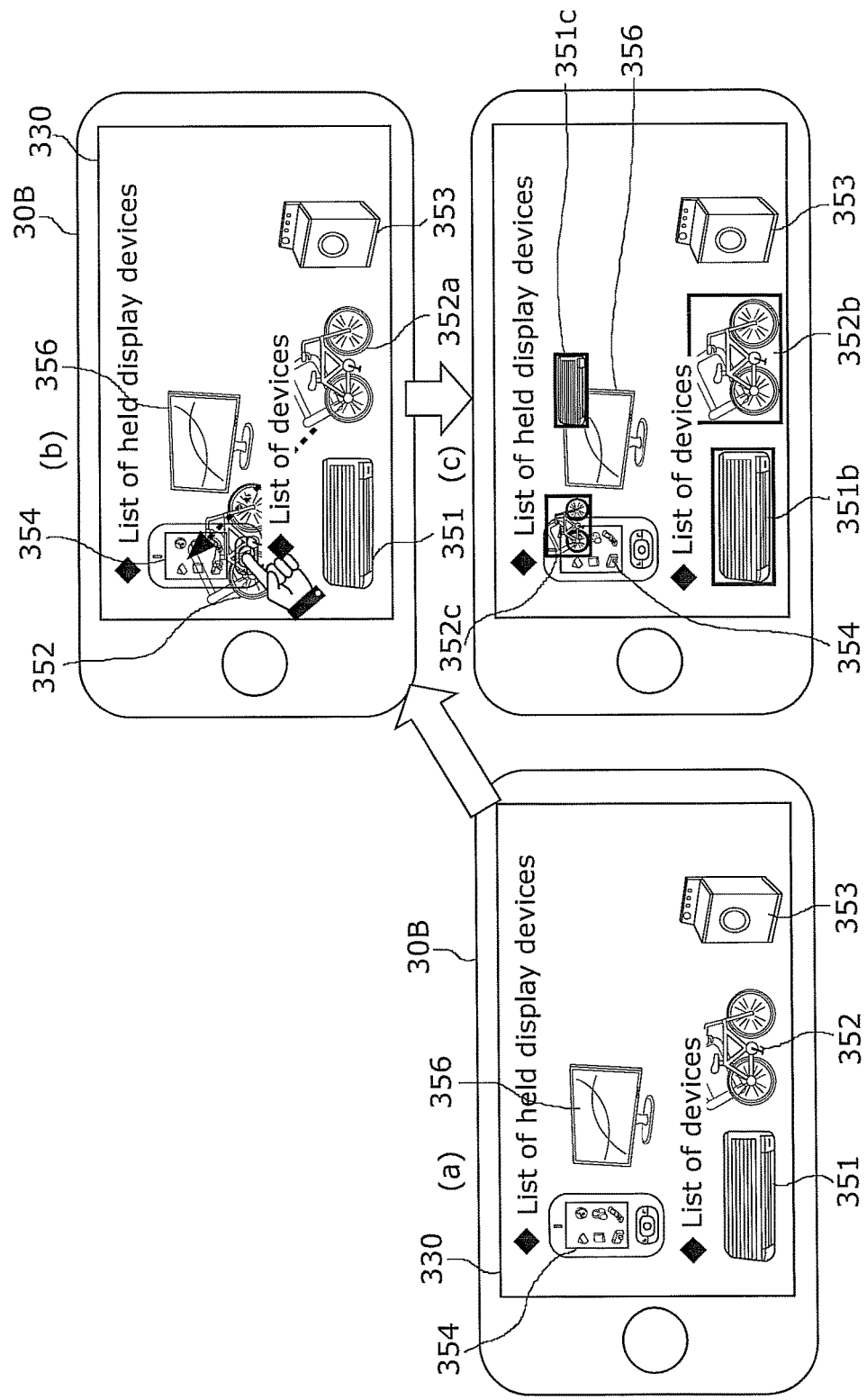

INFORMATION NOTIFICATION APPARATUS AND INFORMATION DISPLAYING METHOD

TECHNICAL FIELD

The present invention relates to information notification apparatuses and information displaying methods.

BACKGROUND ART

In recent years, a system which collects information about a device via a network has been proposed. Here, the information about a device includes information indicating a product number of the device, a device operation history, a device operation state, and a remaining battery level.

Device makers are considering launching a new service with the above described system (for example, Patent Literature 1). In Patent Literature 1, as the new service, a service has been proposed for detecting and notifying a user that the user has forgotten setting preservation although the user has set a reservation time, when a user makes a reservation for a household electrical appliance.

CITATION LIST

Patent Literature

[PTL 1]
Patent Literature 1: Japanese Unexamined Patent Application Publication No. 2007-060622

SUMMARY OF INVENTION

Technical Problem

However, devices which allow a user to set a reservation time are only compatible with the new service using the above described system. In other words, notification that an operation is forgotten cannot be made to the device which does not allow the user to make a reservation, or the device that the user is allowed to make a reservation but the user is not using without setting a reservation. Even when the notification is made, there are cases where the user cannot conduct an operation and forgets again the operation without the location in which the user can respond or the timing when the user can respond.

The present invention has been conceived in order to solve the above described problem, and it is an object of the present invention to provide an information notification apparatus and an information notification method which can provide notification in the most appropriate display location and at the most appropriate timing.

Solution to Problem

An information notification apparatus according to an aspect of the present invention includes: a communication unit configured to receive, from a first device among a plurality of devices which operate on receipt of an input from a user, a first device information item uniquely identifying the first device, and first history information of the first device, the first history information including at least one of a control information item of the first device and a state information item indicating a state of the first device; an information collection database which holds, in association with each other, information of the user owning the first device and the first device information item, and holds, based on the first device information item received by the communication unit, the received first history information in association with the received first history information to the held first device information item, a determination unit configured to determine that it is necessary to transmit notification of the first device when information included in the first device information held in the information collection database satisfies a predetermined condition; a display device designation unit configured to hold destination information indicating one or more display devices to which notification of each of the devices is to be transmitted, and designate, based on the destination information and the received first device information, a display device on which the notification of the first device among the devices is to be displayed; and a generation unit configured to generate the notification when the determination unit determines that it is necessary to transmit the notification of the first device, wherein the communication unit is further configured to transmit the generated notification to the display device designated by the display device designation unit.

It should be noted that these general and specific aspects may be implemented using a system, a method, an integrated circuit, a computer program, or a computer-readable recording medium such as a CD-ROM, or any combination of systems, methods, integrated circuits, computer programs, or recording media.

Advantageous Effects of Invention

The information notification apparatus and the like according to the present invention make it possible to provide notification in an appropriate location and at an appropriate timing.

BRIEF DESCRIPTION OF DRAWINGS

FIG. 1A is a diagram illustrating an overall image of an information providing system according to an embodiment.

FIG. 6 is a diagram illustrating an example of history information stored in an information collection database.

FIG. 7 is a diagram illustrating an example of destination information held in a display device designation unit.

FIG. 11 is a sequence diagram illustrating a series of operations in a device, a display device, and an information notification apparatus.

FIG. 12A is a sequence diagram illustrating a series of operations in a device, a display device, and an information notification apparatus.

FIG. 12B is a sequence diagram illustrating a series of operations in a device, a display device, and an information notification apparatus.

FIG. 28 is a diagram for explaining an example of setting destination information on the screen in FIG. 27.

Figure 1B:
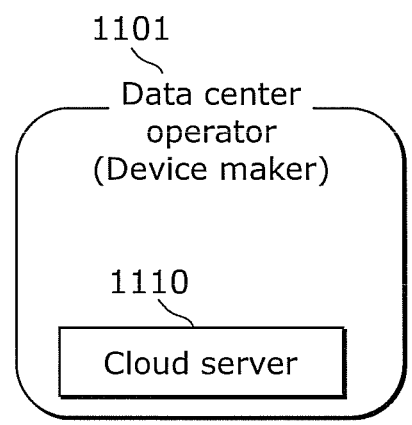
FIG. 1B is a diagram illustrating an example of partial modification of a configuration of the information providing system according to an embodiment.

DESCRIPTION OF EMBODIMENTS (Underlying Knowledge Forming Basis of the Present Invention)

In relation to a system described in the Background section, the inventors have found the following problem.

A system disclosed in PTL1 includes a reservation setting confirmation unit and a reservation forgetting confirmation notification transmitting unit, and the reservation forgetting confirmation notification transmitting unit transmits, to the user, an e-mail of reservation forgetting confirmation when the reservation setting confirmation unit detects that the user forgets reservation setting in the case where the reservation setting is forgotten and the reservation time has come. With this, even when the user forgets reservation setting, it is possible for the user to recognize that the user forgets the setting while staying out.

In the conventional system, however, devices which allow a user to set a reservation time are only compatible with such a service as that of transmitting an e-mail of reservation forgetting confirmation. Notification that an operation is forgotten cannot be made to the device which does not allow the user to make a reservation, or the device that the user is allowed to make a reservation but the user is using without setting a reservation. Even when the notification is made, there are cases where the user cannot conduct an operation and forgets again the operation unless the user is at the location in which the user can respond or the timing is when the user can respond.

An information notification apparatus according to an aspect of the present invention includes: a communication unit configured to receive, from a first device among a plurality of devices which operate on receipt of an input from a user, a first device information item uniquely identifying the first device, and first history information of the first device, the first history information including at least one of a control information item of the first device and a state information item indicating a state of the first device; an information collection database which holds, in association with each other, information of the user owning the first device and the first device information item, and holds, based on the first device information item received by the communication unit, the received first history information in association with the received first history information to the held first device information item, a determination unit configured to determine that it is necessary to transmit notification of the first device when information included in the first device information held in the information collection database satisfies a predetermined condition; a display device designation unit configured to hold destination information indicating one or more display devices to which notification of each of the devices is to be transmitted, and designate, based on the destination information and the received first device information, a display device on which the notification of the first device among the devices is to be displayed; and a generation unit configured to generate the notification when the determination unit determines that it is necessary to transmit the notification of the first device, wherein the communication unit is further configured to transmit the generated notification to the display device designated by the display device designation unit.

With this aspect, it is possible to realize the information notification apparatus which makes it possible to provide notification in an appropriate display location and at an appropriate timing.

More specifically, the display device designation unit, according to the obtained device information, can designate the display device, and display a display device suitable for each device. With this, since it is displayed in a location in which the user can respond, it is possible to reduce the number of cases where the user misses the notification.

Here, for example, it is possible that the first history information received by the communication unit includes a time information item indicating time about the at least one of the control information item of the first device and the state information item indicating the state of the first device.

Moreover, for example, it is possible that the information notification apparatus further includes a timepiece capable of obtaining a time information item, wherein the information collection database obtains, from the timepiece, a time information item indicating time when the communication unit received the first history information, when the time information item is not included in the first history information received by the communication unit, and holds, in association with each other, the first history information and the obtained time information item.

Moreover, it is possible that in an information notification apparatus according to an aspect of the present invention further includes a position information identification unit configured to identify, by referring to the control information item included in history information of the devices held in the information collection database, a second device having history information including a time information item closest to current time among the devices, wherein the display device designation unit is further configured to designate the second device as a display device to which the notification of the first device is to be transmitted, when the second device identified by the position information identification unit has a display function.

With this aspect, since the user can predict that the user is operating the specified device (second device) or is near the specified device by identifying the device which operates at a time closest to the current time, it is possible to more efficiently convey the notification to the user by displaying the notification in the identified second device.

Moreover, it is possible that in an information notification apparatus according to an aspect of the present invention further includes a position information identification unit configured to identify a position of the user, wherein the determination unit is configured to determine that it is necessary to transit the notification of the first device when (i) the information included in the first history information held in the information collection database satisfies a predetermined condition, and (ii) the identified position of the user is a position previously determined as the position in which the user is capable of responding to the notification.

With this aspect, since it is found that the user is at the location (current location) in which the user can respond to notification by identifying the location of the user, it is possible to determine whether or not the notification is necessary. With this, it is possible for the user to receive notification at an appropriate timing when the user can respond.

Moreover, it is possible that in an information notification apparatus according to an aspect of the present invention further includes a pattern extraction unit configured to extract a use pattern when the user uses the first device, by referring to the first history information held in the information collection database, wherein the determination unit is configured to determine that it is necessary to transmit the notification which encourages use of the first device indicated by the use pattern when determining, from the first history information, the first device indicated by the use pattern extracted by the pattern extraction unit is not used, the generation unit is configured to generate the notification which encourages use of the first device, and the communication unit is configured to transmit the generated notification to the display device designated by the display device designation unit.

With this aspect, it is possible to convey notification in a timing and a condition suitable to an individual user by extracting a user-specific use pattern. With this, it is possible for the user to receive notification at a more appropriate timing.

Moreover, for example, it is possible that the information included in the first history information is a value of a remaining battery level of the first device when the first device is an electrically assisted pedal cycle, and the predetermined condition indicates whether or not the remaining battery level is no more than a predetermined value indicating a level necessary to recharge the first device.

Moreover, an information displaying method according to an aspect of the present invention is an information displaying method in a system which controls a plurality of devices each of which operates on receipt of an input from a user, an information notification apparatus which obtains an information item about an operation state from each of the devices, and a plurality of display devices each of which obtains and displays an information item about an operation state of at least a first device among the devices from the information notification apparatus, the information displaying method including: determining that it is necessary to notify the information item about the operation state of the first device when the information item about the operation state of the first device satisfies a predetermined condition; notifying an operation state of the first device among the display devices by designating a first display device on which notification is to be displayed; and displaying the notified information item about the operation state of the first device on the designated first display device.

With this aspect, it is possible to display notification in an appropriate display location and at an appropriate timing.

Moreover, for example, it is possible that the information displaying method further includes: determining that it is necessary to notify an information item about an operation state of a second device when the information item about the operation state of the second device among the devices satisfies a predetermined condition, the second device being different from the first device; performing notification of an operation state of the second device among the display devices by designating a second display device on which the notification is to be displayed, the second display device being different from the first device; and displaying the notified information item about the operation state of the notified second device on the designated second device.

Moreover, for example, it is possible the information displaying method further includes displaying, on the first display device, that the operation state of the second device is displayed on the second display device, along with an information item about the notified operation state of the first device.

Moreover, for example, it is possible that the information displaying method further includes: displaying, on a screen of the first display device, a list of icons indicating the display devices owned by the user and a list of icons indicating the devices owned by the user; and receiving, in the screen, a user operation of associating the icon indicating the first device with the icon indicating the first display device, to designate the first display device as a display device on which notification of the operation state of the first device is to be displayed, among the display devices.

It should be noted that these general and specific aspects may be implemented using a system, a method, an integrated circuit, a computer program, or a computer-readable recording medium such as a CD-ROM, or any combination of systems, methods, integrated circuits, computer programs, or recording media.

(Overall Image of Service to be Provided)

FIG. 1A illustrates an overall image of an information providing system according to an embodiment.

A group 1000 includes, for example, a company, an association, and a family, and the size does not matter. The group 1000 includes a device A and a device B that is a plurality of devices 1010, and a home gateway 1020. The devices 1010 include devices connectable to the Internet (for example, smartphone, personal computer, television, etc.), and devices not connectable to the Internet by themselves (for example, illumination device, washing machine, refrigerator, etc.). There may be devices which can be connected to the Internet via the home gateway 1020, even if devices are not connectable to the Internet by themselves. Moreover, the group 1000 includes a user 1 who uses the devices 1010.

A data center operator 1100 includes a cloud server 1110. The cloud server 1110 is a virtual server which collaborates with various devices via the Internet. The cloud server 1110 manages data that is difficult to handle with a normal database management tool (big data). The data center operator 1100 manages data and the cloud server 1110, and operates the data center which performs the management. The service performed by the data center operator 1100 will be described later.

Figure 1C:
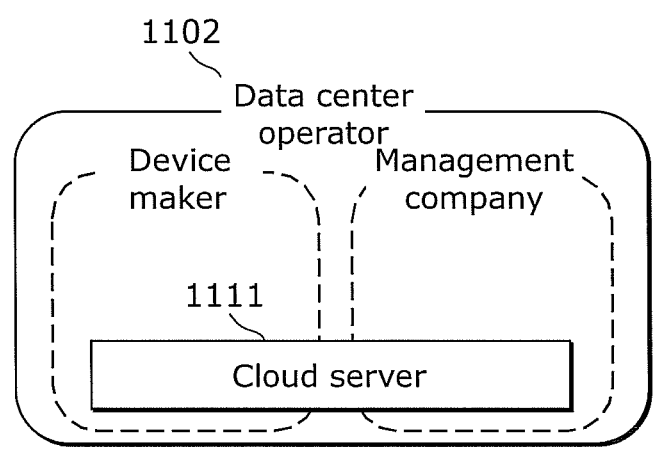
FIG. 1C is a diagram illustrating an example of partial modification of a configuration of the information providing system according to an embodiment.

It should be noted that the data center operator 1100 is not limited to a company which performs data management and operates the cloud server 1110. For example, when a device maker which develops and manufactures one of the devices 1010 performs data management and manages the cloud server 1110, the device maker corresponds to the data center operator 1100 (FIG. 1B). Moreover, the data center operator 1100 is not limited to one company. For example, when a device maker or a management company jointly manage data and operates the cloud server 1110 or divide the data management and the operation of the cloud server 1110 between them, both or one of them correspond to the data center operator 1100 (FIG. 1C).

A service provider 1200 holds a server 1210. Here, the server 1210 includes a memory in an individual PC independently of the size. There are cases where the service provider 1200 does not hold the server 1210.

It should be noted that the home gateway 1020 is not indispensable in the above described service. For example, when the cloud server 1110 perform all the data management, the home gateway 1020 is not necessary. Moreover, there are cases where there are no devices connectable to the Internet by themselves as shown in the case where various devices at home are connected to the Internet.

Next, a flow of information in the above described service will be described.

First, device A or device B in the group 1000 transmits each log information to the cloud server 1110 in the data center operator 1100. The cloud server 1110 amasses the log information of device A or device B ((a) in FIG. 1A). Here, the log information is information of the devices 1010 indicating the operation state, the operation date, and the like, for example. For example, log information includes information that can be obtained various devices, such as television viewing history, recording reservation information of a recorder, an operation date and time of a washing machine, an amount of the laundry, a date and time of opening and closing the refrigerator and the number of openings and closures of the refrigerator, and the like. Log information is sometimes provided to the cloud server 1110 directly from the devices 1010 themselves via the Internet. Log information may be amassed in the home gateway 1020 from the devices 1010, and may be provided to the cloud server 1110 from the home gateway 1020.

Next, the cloud server 1110 in the data center operator 1100 provides log information to the service provider 1200 in a predetermined unit. Here, the predetermined unit may be a unit of which information amassed in the data center operator can be provided to the service provider 1200 by organizing the information, and a unit of which the service provider 1200 makes a request. The unit does not have to be predetermined, and the amount of information varies according to the situation. The log information is stored in the server 1210 held by the service provider 1200 where necessary ((b) in FIG. 1A). Then, the service provider 1200 organizes the log information into information compatible with the service to be provided to the user, and provides the organized information to the user. The user may be the user 1 who uses the devices 1010, and an external user 2. As a method for providing the service to the user, for example, the service may be provided to the user directly from the service provider ((b), (e) in FIG. 1A). Moreover, as a method for providing the service to the user, for example, the service may be provided to the user via the cloud server 1110 in the data center operator 1100 again. Moreover, the cloud server 1110 in the service provider 1200 may organize the log information into information compatible with the service to be provided to the user, and may provide the organized information to the user.

It should be noted that the user 1 and the user 2 may be the same or different.

The information notification apparatus and the information displaying method will be described with reference to the drawings. It should be noted that the following embodiments are general or specific examples of the present invention. The numerical values, shapes, materials, structural elements, the arrangement and connection of the structural elements, steps, the processing order of the steps etc. shown in the following exemplary embodiments are mere examples, and therefore do not limit the scope of the present invention. Therefore, among the structural elements in the following exemplary embodiments, structural elements not recited in any one of the independent claims indicating the most generic concept are described as arbitrary structural elements.

Embodiment 1

[Overall Configuration of System]

Figure 2A:
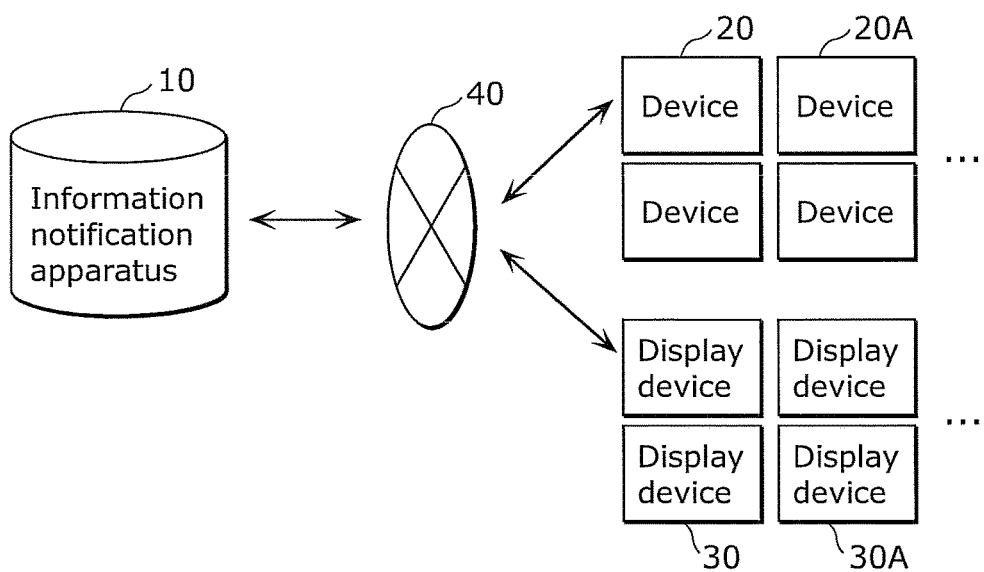
FIG. 2A is a diagram illustrating a configuration of a system including an information notification apparatus according to Embodiment 1.

FIG. 2A is a diagram illustrating a configuration of a system including an information notification apparatus 10 according to Embodiment 1. The illustrated system includes the information notification apparatus 10, a device 20, a display device 30, and a network 40.

The information notification apparatus 10, for example, is a Web server which holds a database owned by the device maker. The information notification apparatus 10 is connected to the device 20 and the display device 30 via the network 40. The information notification apparatus 10 registers information transmitted via the network 40 from the device 20, generates notification based on the registered information, and transmits (transfers) notification to be displayed on the display device 30 to the display device 30 via the network 40. It should be noted that the information notification apparatus 10 corresponds to the server 1210 in an example illustrated in FIG. 1A.

The device 20 is a device used every day, such as a household electrical appliance, an illumination device, a vehicle, and a terminal device. The household electrical appliance includes a) audio visual (AV) electrical appliance such as a television receiver and a digital recorder, b) domestic electrical appliance such as a refrigerator, a washing machine, an air conditioner, a rice cooker, a vacuum cleaner, and induction heating (IH) cooking heater, c) health electrical appliance such as a toothbrush, a blood pressure monitor, and a body composition monitor, and d) beauty electrical appliance such as a dryer and a shaver. Moreover, the vehicle includes an electric vehicle and an electrically assisted pedal cycle, for example. The terminal device includes a smartphone, a feature phone, a tablet, and a personal computer, for example. It should be noted that the device 20 corresponds to the devices 1010 in an example illustrated in FIG. 1A.

The display device 30 is a device which mounts a display, such as a mobile phone (smartphone or a feature phone), a tablet, a television, a refrigerator and a washing machine both having a display, for example. It should be noted that the display device 30 corresponds to the devices 1010 in an example illustrated in FIG. 1A. In the present embodiment, however, the display device 30 and the device 20 will be described as different as long as the display device 30 and the device 20 are not referred.

The network 40 includes a wired network such as Ethernet (registered trademark), a wireless network such as wireless LAN, a public network, or a network by combination of the networks. The public network is a communication line provided for communication by a large indefinite number of users by a telecommunications operator, and includes a general telephone line or Integrated Services for Digital Network (ISDN).

Figure 2B:
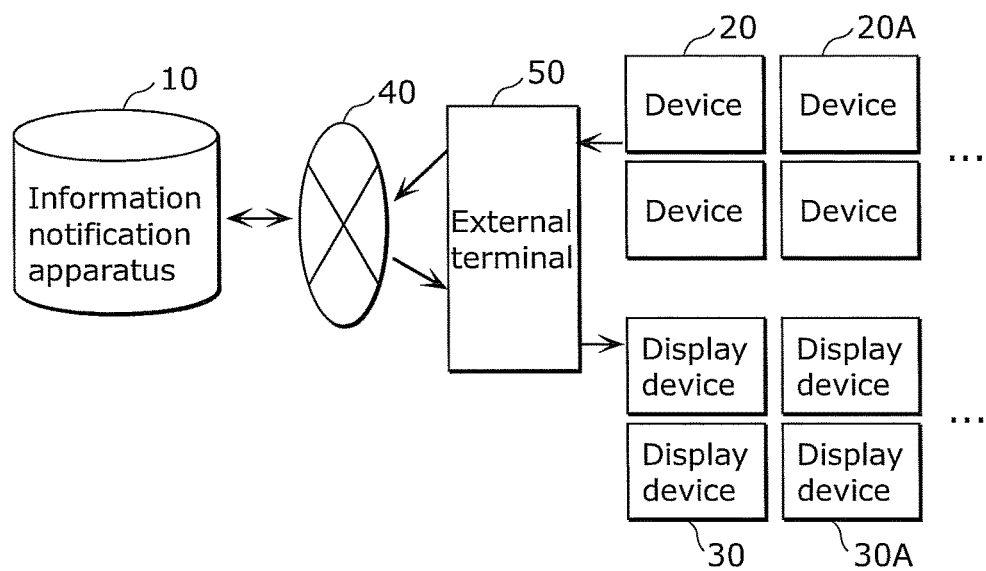
FIG. 2B is a diagram illustrating a modification of a configuration of a system including an information notification apparatus according to Embodiment 1.

It should be noted that as illustrated in FIG. 2B, the device 20 and the display device 30 may be connected to the network 40 via an external terminal 50. Moreover, the device 20 may be connected to the network 40 via the external terminal 50 while the display device 30 may be connected to the network 40 not via the external terminal 50, or the device may be connected to the network 40 not via the external terminal 50 while the display device 30 may be connected to the network 40 via the external terminal 50.

The external terminal 50, for example, is a terminal which is connected to the network 40, such as a mobile phone (smartphone or feature phone), a tablet, a router, and an access point. A method for connecting the external terminal 50 and the device 20 includes (i) connection by adjacent communication such as radio frequency identification (RFID) tag, near field communication: ISO/IEC 21481 (NFC), Wireless Fidelity (Wi-Fi), and Bluetooth (registered trademark), or (ii) connection by cable using LAN cable and the like. It should be noted that the external terminal 50 corresponds to the home gateway 1020 in an example illustrated in FIG. 1A.

The device 20 and the display device 30 indicate a plurality of the devices 20 and a plurality of the display devices 30 as illustrated in FIGS. 2A and 2B. The information notification apparatus 10 collects information each for the devices 20, and can transmit notification to at least one of the display devices 30. The present embodiment will be described by taking an electrically assisted pedal cycle as an example of the device 20 and a smartphone as an example of the display device 30.

[Configuration of Device]

Figure 3:
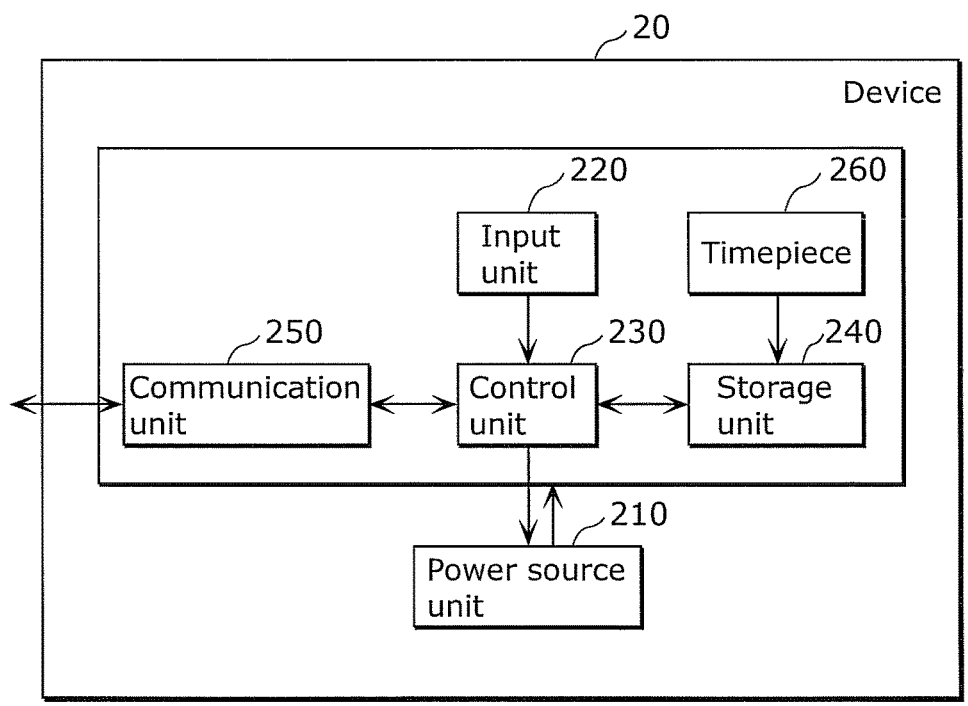
FIG. 3 is a block diagram illustrating a functional configuration of a device according to Embodiment 1.

FIG. 3 is a block diagram illustrating a functional configuration of the device 20 according to Embodiment 1. The illustrated device 20 operates on receipt of an operation such as input from the user, and includes a power source unit 210, an input unit 220, a control unit 230, a storage unit 240, and a communication unit 250.

The power source unit 210 is a main power source of the device 20. When the power source unit 210 is ON, power is supplied to the whole of the device 20 from the power source unit 210. When the power source unit 210 is OFF, power supply is stopped to the whole of the device 20.

The input unit 220 is a portion which receives the user operation. The input unit 220 is, for example, a portion that the user can operate, such as a power source button, a running mode change button, a brake, or a pedal.

The control unit 230 is a portion which controls the overall operation of the device 20, and controls the device 20 on receipt of an operation of the input unit 220, and then stores control information of the device 20 in the storage unit 240. The control unit 230 further collects and calculates state information of the device 20 generated by the user operation, and stores the state information in the storage unit 240.

Here, the control information of the device 20 is, for example, information indicating a phenomenon that the device 20 is changed to a power mode when the user pushes a mode change button that is a portion of the operation portion of the input unit 220, and then the device 20 is changed to a power mode. This control information is registered in association with time information of a timepiece 260 (for example, the device is changed to a power mode at xx:xx). The time information associated with the control information is not obtained from the timepiece 260 held by the device 20. For example, the information notification apparatus 10 may hold the timepiece. In that case, when the information notification apparatus 10 obtains history information (to be described later) from the device 20, time information indicating the time when the information notification apparatus 10 receives history information may be associated with the history information.

Moreover, the state information of the device 20 is information indicating the state of the device 20, such as a running distance calculated from the number of pedal rotations and a remaining battery level (for example, the running distance is 1000 meters, the remaining battery level is 40%, and so on). The state information is registered in association with the time information as similarly to the above described control information. The state information may be collected or calculated at every user operation such as input, and may be collected or calculated at an equal interval (for example, at a five-minute interval), and may be stored in the storage unit 240. The present embodiment will be described by assuming that history information includes at least one of the control information and the state information.

The storage unit 240 stores history information which includes (i) at least one of the control information and the state information of the device 20 in the control unit 230, and (ii) device information of the device 20. Here, the device information of the device 20 is information that allows for uniquely recognizing the device 20, and is information that allows for identifying the electrically assisted pedal cycle such as the product number of the device, for example.

The communication unit 250 transmits the device information and the history information stored in the storage unit 240 to the information notification apparatus 10 via the network 40. The communication unit 250 may transmit the device information and the history information at an equal interval (for example, at a five-second interval), may transmit the device information and the history information at a timing of the user manual operation, and may transmit the device information and the history information at a timing requested by the information notification apparatus 10.

The timepiece 260 manages time information indicating the current time, and manages, for example, information such as 12:30:15, Sep. 1, 2012.

[Configuration of Display Device]

Figure 4:
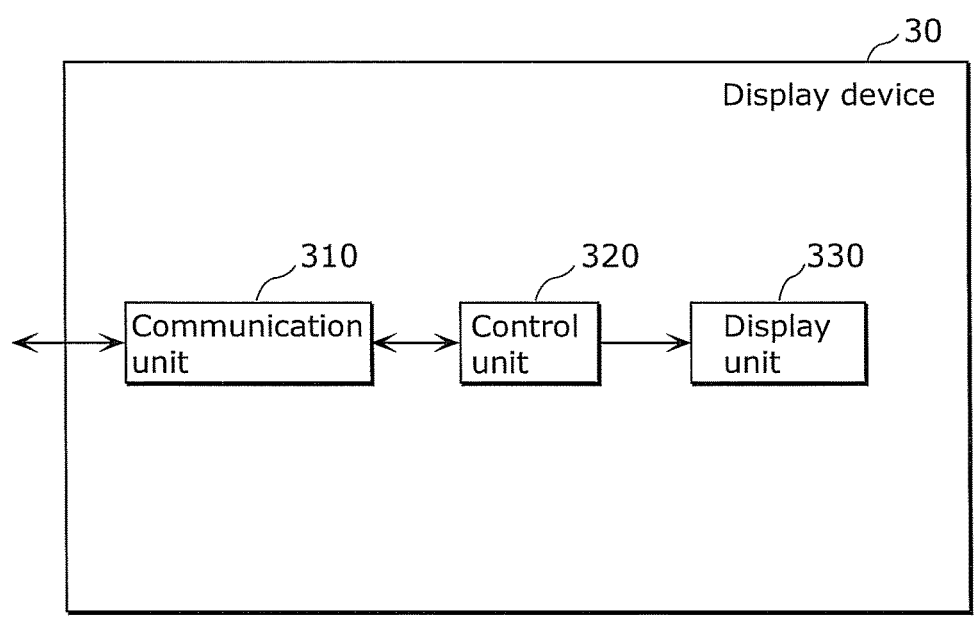
FIG. 4 is a block diagram illustrating a functional configuration of a display device according to Embodiment 1.

FIG. 4 is a block diagram illustrating a functional configuration of the display device 30 according to Embodiment 1. The illustrated display device 30 includes a communication unit 310, a control unit 320, and a display unit 330.

The communication unit 310 receives notification transmitted from the information notification apparatus 10.

The control unit 320 causes the display unit 330 to display notification received by the communication unit 310. It should be noted that notification may be received by mail. In this case, that is, when notification is received by mail and the like, the control unit 320 causes the display unit 330 to display notification by a user operation.

The display unit 330 has a display screen, and displays notification on the display screen.

[Configuration of Information Notification Apparatus]

Figure 5:
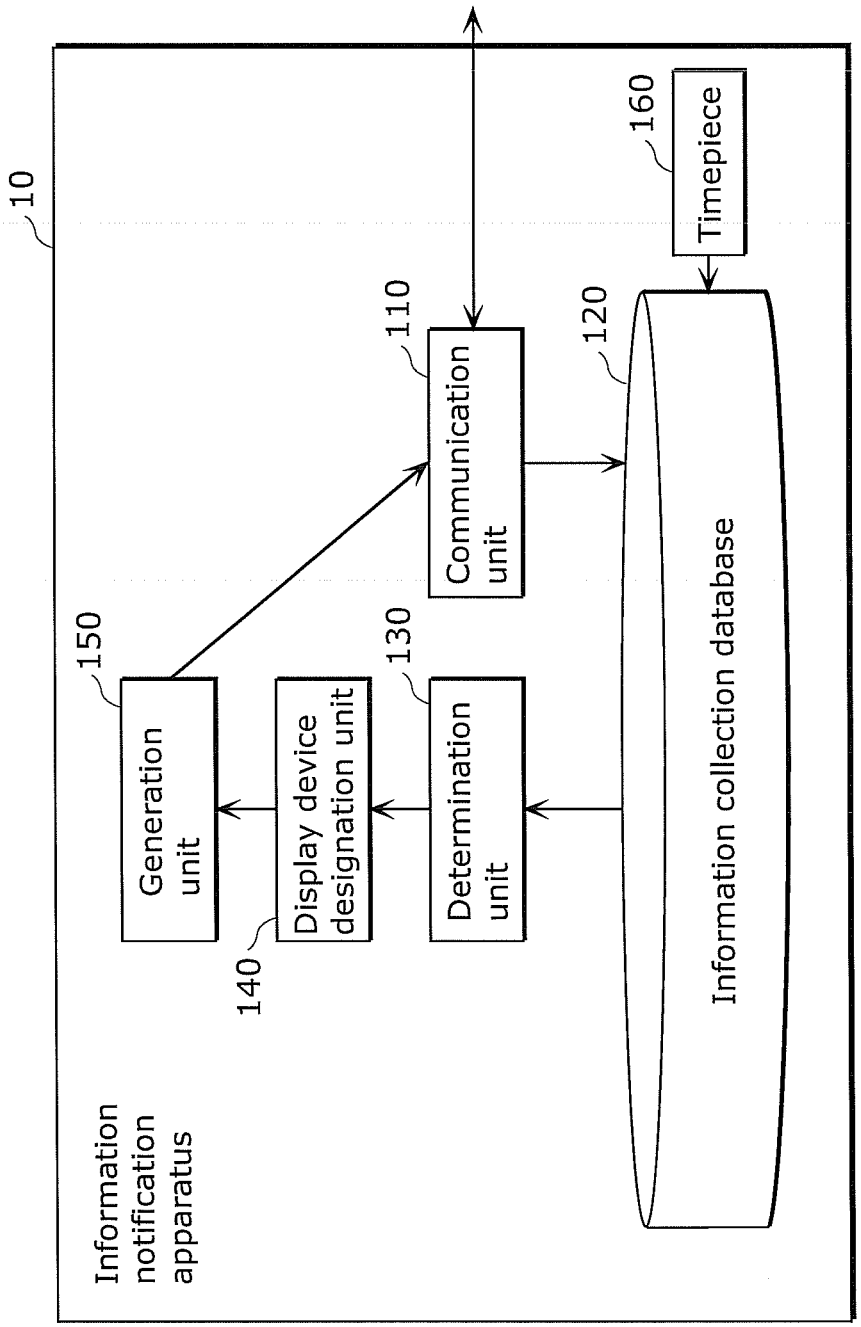
FIG. 5 is a block diagram illustrating a functional configuration of an information notification apparatus according to Embodiment 1.

FIG. 5 is a block diagram illustrating a functional configuration of the information notification apparatus 10 according to Embodiment 1. FIG. 6 is a diagram illustrating an example of history information stored in an information collection database. FIG. 7 is a diagram illustrating an example of destination information held in a display device designation unit.

The information notification apparatus 10 illustrated in FIG. 5 includes a communication unit 110, an information collection database 120, a determination unit 130, a display device designation unit 140, a generation unit 150, and a timepiece 160. The information notification apparatus 10 obtains information such as information about an operation state from each of the devices.

The communication unit 110 receives, from the first device (device 20) among the devices which operate on receipt of the user input, the first device information which uniquely identifies the first device, and the first history information of the first device which includes at least one of the control information of the first device and the state information indicating the state of the first device, and then transmits notification. The communication unit 110 transmits the generated notification to the display device designated by the display device designation unit 140.

Specifically, the communication unit 110 receives the device information and the history information from one of the devices 20, and then registers the device information and the history information in the information collection database 120. Moreover, the communication unit 110 transmits the notification generated by the generation unit 150 to the display device 30 designated by the display device designation unit 140. It should be noted that the device information and the history information from the device 20 may be obtained at a timing requested by the communication unit 110, may be obtained at an interval set by the device 20 or a timing when the device information and the history information are transmitted from the device 20, and may be obtained at an equal interval set by the communication unit 110 (for example, five seconds).

The information collection database 120 holds information of the user holding the first device (device 20) (user information) and the first device information in association with each other, and holds the received first device information in association with the held first device information, based on the first device information received by the communication unit 110. When the history information received by the communication unit 110 does not include time information, the information collection database 120 obtains time information indicating the time when the communication unit 110 receives history information from the timepiece 160, and holds, in association with each other, the history information and the obtained time information.

Specifically, the information collection database 120 stores, in association with each other, the user information and the device information. It should be noted that the user information is the information of user, such as a name, a birth date, and an address. The user information, when connecting the device 20 to the network 40, is simultaneously registered in association with the device information. Here, since it is presupposed that the device 20 is connected to the network 40, the description of a registration method when the device 20 is first connected to the network 40 will be omitted.

An example of the content recorded in the information collection database 120 is illustrated in FIG. 6. In other words, the user information and the device information are registered in association with each other. Furthermore, the history information is registered in association with the device information. Moreover, as illustrated in FIG. 6, the history information may also be associated with the time information. When the time information is not provided to the history information obtained by the communication unit 110, the history information may be registered in the information collection database 120 in association with the time information of the timepiece 160. The content illustrated in FIG. 6 is an example, the content is not limited to such. For example, the device information may be registered in association with the user who is using the device. Moreover, the history information may include not only the content illustrated in FIG. 6 but also all information items that can be detected by the device 20, such as a running distance and a driving mode change history.

When information included in the first history information held in the information collection database 120 satisfies a predetermined condition, the determination unit 130 determines that it is necessary to transmit notification of the first device (device 20).

Specifically, the determination unit 130 determines whether or not notification is generated based on identification information and a condition set for each of the devices. It should be noted that the identification information is an information item or information items included in the history information, such as the information of a remaining battery level included in the history information of the electrically assisted pedal cycle. Moreover, the condition indicates whether or not the remaining battery level is less than a threshold (for example 20%). When the identification information satisfies this condition, the determination unit 130 determines that it is necessary to generate notification.

It should be noted that the condition (for example, a threshold) or a combination of the identification information and the condition is set and held by the information notification apparatus 10. For example, when the device is an electrically assisted pedal cycle, a combination of the identification information being the remaining battery level and the condition being less than 20% is held. It should be noted that the combination of the identification information and the condition is not limited to the case where the determination unit 130 holds the combination, and the combination may be held by the information collection database 120. The present embodiment describes that the determination unit 130 holds the combination.

The display device designation unit 140 holds the destination information indicating one or more display devices to which notification for each of the one or more devices should be transmitted. The display device designation unit 140 designates, based on the destination information and the received first device information, a display device on which notification of the first device among the display devices should be displayed.

Specifically, the display device designation unit 140 holds information indicating which display device to receive through transmission and display notification for the device 20 (destination information), and designates a specific display device 30 based on the device information of the device 20. The display device designation unit 140 holds for example, destination information illustrated in FIG. 7, checks the display device 30 associated with the device 20 from the destination information illustrated in FIG. 7, and designates the checked display device 30.

It should be noted that the device and the display device do not have to be associated with each other on a one-to-one basis, as illustrated in FIG. 7. A plurality of display devices may be associated with the device, and notification may be transmitted from the communication unit 110 to the display devices. Moreover, the association between the device and the display device illustrated in FIG. 7, that is, destination information may be set by the information notification apparatus 10, and may be set and changed by the user of the device 20, and the like. Moreover, destination information, as described in Modification 2, may be dynamically changed from the history information. Moreover, destination information may be stored in the information collection database 120.

The generation unit 150 generates notification when the determination unit 130 determines that it is necessary to transmit notification of the first device. Specifically, the generation unit 150 generates notification when the determination unit 130 determines that it is necessary to generate notification. The notification may be generated in the form of mail, may be generated in the form of displaying on the display unit of the display device 30 such as push notification, and may be displayed on the app by automatically starting the app installed in the display device 30.

The timepiece 160 manages time information indicating the current time, and manages, for example, information such as that of 12:30:15, Sep. 1, 2012.

[Method for Controlling Device]

Figure 8A:
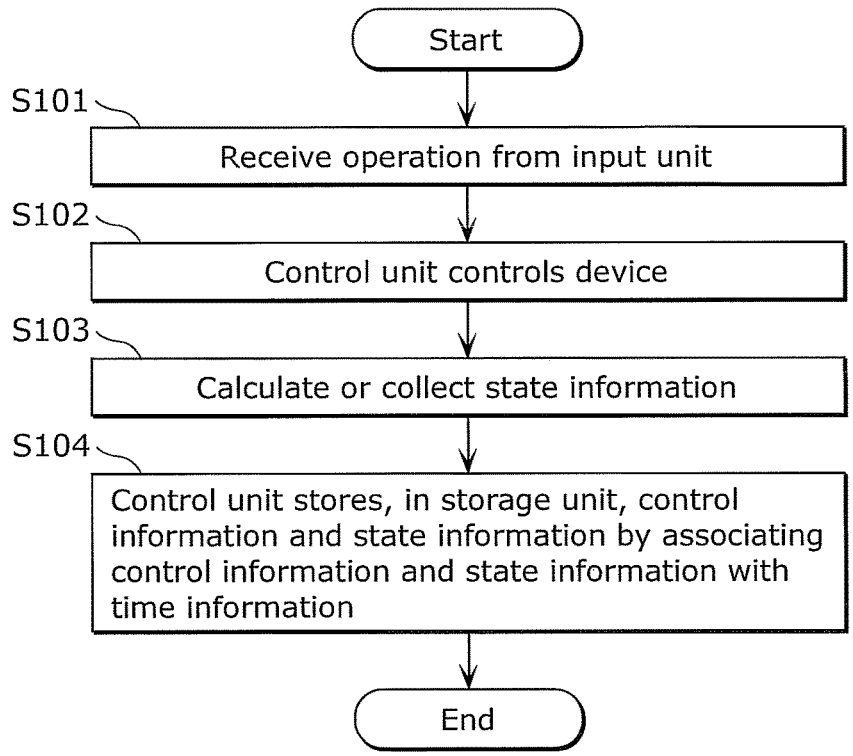
FIG. 8A is a flowchart illustrating a flow of control in a device according to Embodiment 1.
Figure 8B:
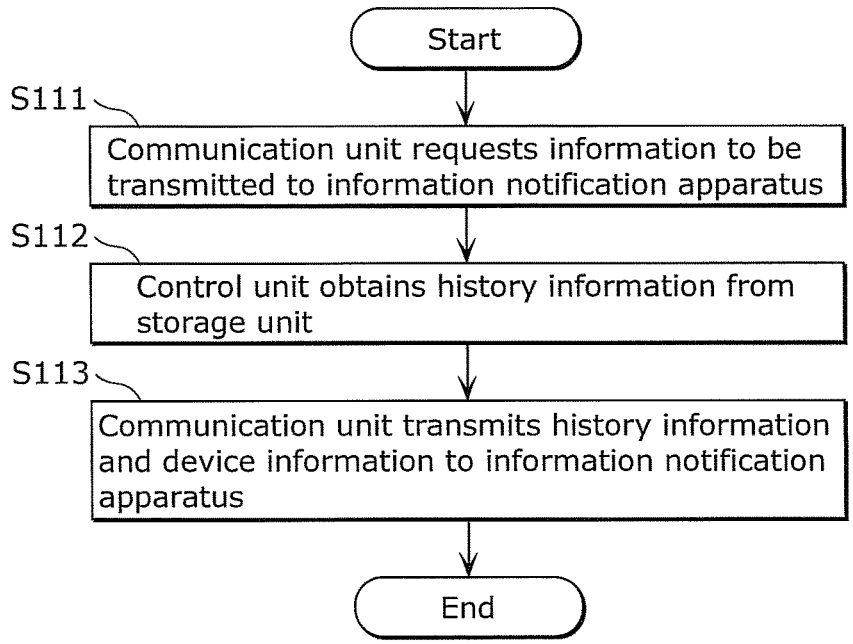
FIG. 8B is a flowchart illustrating a flow of control in a device according to Embodiment 1.

The following will describe a method for controlling the above described device 20 with reference to FIGS. 8A and 8B. FIGS. 8A and 8B are each a flowchart illustrating a flow of control in the device 20 according to Embodiment 1.

First, the input unit 220 receives the user operation (S101).

Next, the control unit 230 controls the device 20 based on the operation received by the input unit 220 (S102).

Next, the control unit 230 collects or calculates the state information of the device 20 (S103).

Next, the control unit 230 causes the storage unit 240 to store control information and state information as history information by associating the control information and the state information with time information (S104).

The device 20 performs the process illustrated in FIG. 8B in parallel with the control described using FIG. 8A.

In other words, first, the communication unit 250 requests the control unit 230 for information to be transmitted to the information notification apparatus 10 (S111). Next, the control unit 230 obtains history information and device information from the storage unit 240 (S112). Next, the communication unit 250 transmits, to the information notification apparatus 10, the history information and the device information obtained by the control unit 230 (S113).

[Method for Controlling Information Notification Apparatus]

Figure 9A:
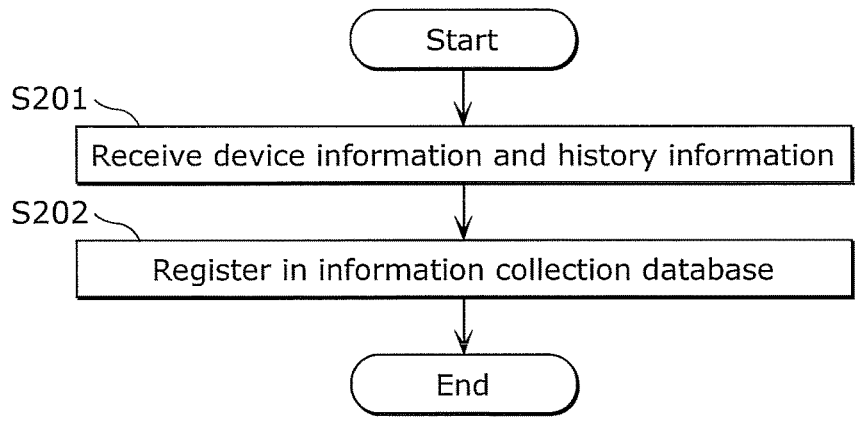
FIG. 9A is a flowchart illustrating a flow of control in an information notification apparatus according to Embodiment 1.
Figure 9B:
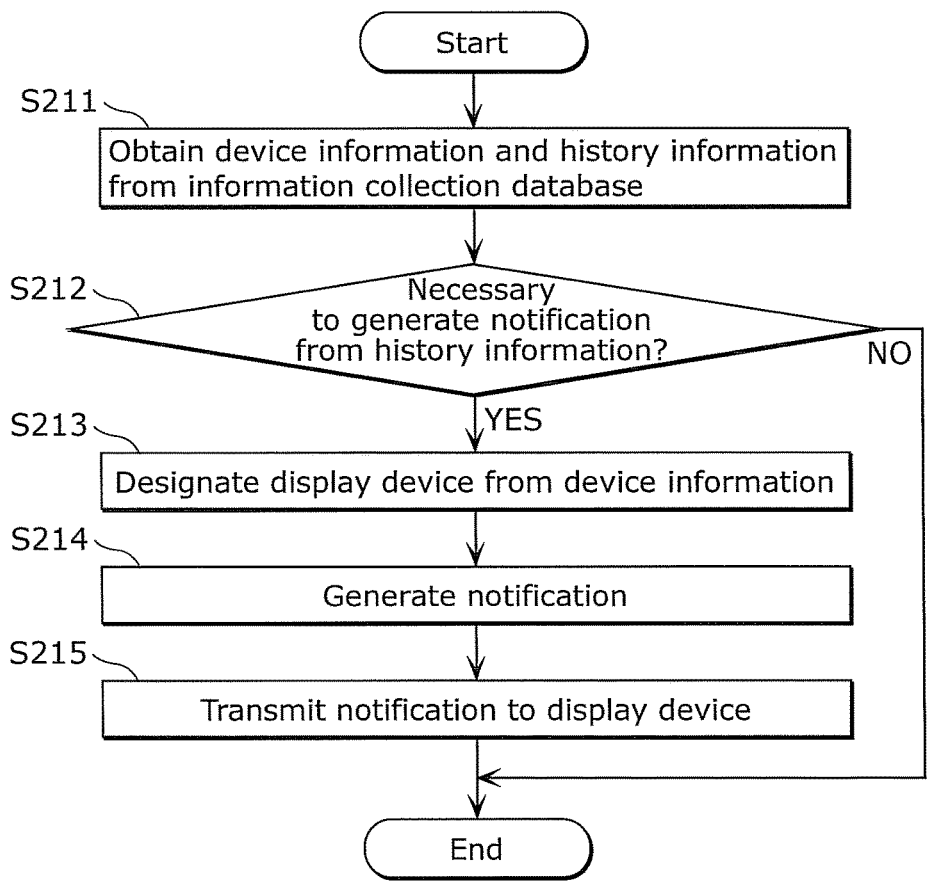
FIG. 9B is a flowchart illustrating a flow of control in an information notification apparatus according to Embodiment 1.

The following will describe a method for controlling the above described information notification apparatus 10 with reference to FIGS. 9A and 9B. FIGS. 9A and 9B are each a flowchart illustrating a flow of control in the information notification apparatus 10 according to Embodiment 1.

First, the communication unit 110 receives history information and device information from the device 20 (S201).

Next, the communication unit 110 registers, based on device information, history information and device information in the information collection database 120 by associating the history information and the device information with the user information (S202). It should be noted that as described above, when the history information is not associated with the time information, the history information and the time information are registered in the information collection database 120 by associating, with each other, (i) the time information when the communication unit 110 received and (ii) the history information.

The information notification apparatus 10 performs the process illustrated in FIG. 9B in parallel with the control described using FIG. 9A. In other words, first, the determination unit 130 obtains history information and device information from the information collection database 120 (S211).

Next, the determination unit 130 determines whether or not it is necessary to generate notification, based on whether or not the identification information included in history information satisfies a predetermined condition (S212).

When the determination unit 130 determines that it is not necessary to generate notification (NO in S212), the series of the processes is ended. Meanwhile, when the determination unit 130 determines that it is necessary to generate notification (YES in S212), the display device designation unit 140 designates, based on the device information, the display device on which notification should be displayed (S213).

Next, the generation unit 150 generates notification to be displayed on the designated display device (S214).

Then, the communication unit 110 transmits the notification generated by the generation unit 150 to the display device designated by the display device designation unit 140 (S215).

[Method for Controlling Display Device]

Figure 10:
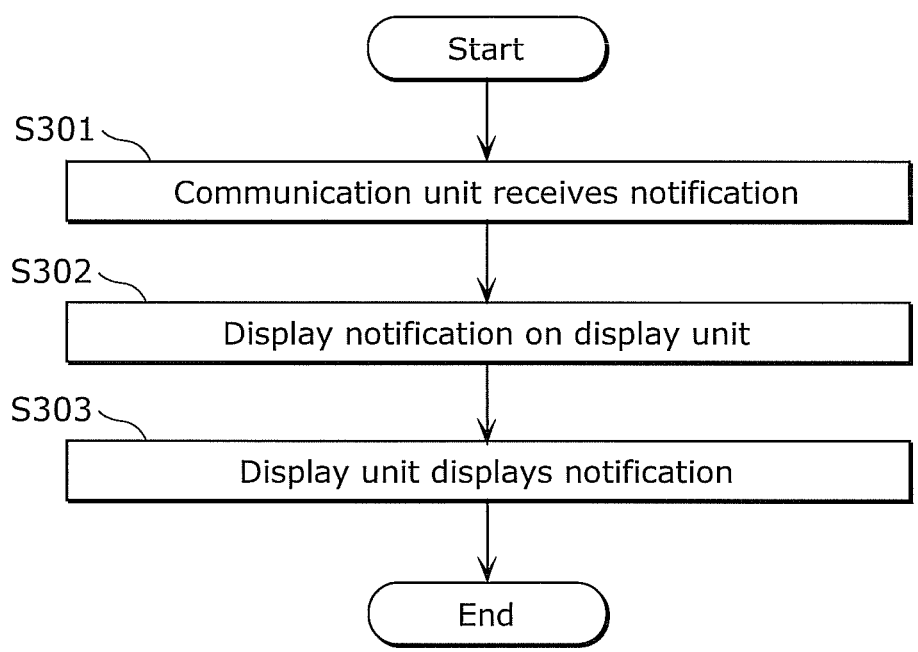
FIG. 10 is a flowchart illustrating a flow of control in a display device according to Embodiment 1.

The following will describe a method for controlling the above described device 30 with reference to FIG. 10. FIG. 10 is a flowchart illustrating a flow of control in the display device 30 according to Embodiment 1.

First, the communication unit 310 receives notification from the information notification apparatus 10 (S301).

Next, when receiving notification, the control unit 320 causes the display unit 330 to display notification on the display unit 330 (S302).

Then, on receipt of a command from the control unit 320, the display unit 330 displays notification on the display unit 330 (S303).

[Sequence of Device, Display Device, and Information Notification Apparatus]

FIG. 11, FIG. 12A, and FIG. 12B are each a sequence diagram illustrating a series of operations in a device, a display device, and an information notification apparatus. FIG. 11 is a diagram illustrating by compiling the operation each for the device, the display device, and the information notification apparatus that are described in FIGS. 8A to 10. The same reference signs are assigned to the same elements as those in FIGS. 8A to 10. Although the wordings described in the elements are simplified, a detailed explanation is omitted due to the same processes.

It should be noted that as illustrated in FIG. 11, the process of S104 is performed by the device 20. However, the process of S104 is not only performed by the device 20. For example, as illustrated in FIG. 12A, the process of S104 may be performed by the information notification apparatus 10. In that case, the device 20 may not perform S104, and may only transmit history information and device information to the information notification apparatus 10 in S113. In this case, the information notification apparatus 10 may, in S104, associate the control information and the state information received in S201 with the time information, thereby generating history information, may store the history information in the storage unit 240 in the device 20, and may register the history information in the information collection database 120 in S202.

It should be noted that as illustrated in FIG. 11, the process of S214 is performed by the information notification apparatus 10. However, the process of S104 is not only performed by the information notification apparatus 10. For example, as illustrated in FIG. 12B, the process of S214 may be performed by the display device 30. In this case, the information notification apparatus 10 may, without performing S214, transmit, to the display device 30 in S215, a message that notification should be displayed. Then, when receiving the message that notification should be displayed, the display device 30 may generate notification to be displayed in S214.

It should be noted that the processes performed by the device, the display device, and the information notification apparatus are not limited to the examples illustrated in FIGS. 11, 12A, and 12B. Some of the processes performed by the device, the display device, and the information notification apparatus illustrated in FIGS. 11 to 12B may be performed by a different device, a different display device and a different information notification apparatus.

[Advantageous Effects]

As described above, with the present embodiment, it is possible to realize the information notification apparatus 10 which makes it possible to provide notification in an appropriate display location and at an appropriate timing.

More specifically, in the information notification apparatus 10, the determination unit 130 determines whether or not it is necessary to generate notification from history information of the device 20, and the display device designation unit 140 designates the appropriate display device. With this, it is possible to display notification in an appropriate display device and at an appropriate timing for the user, it is possible to reduce the number of cases where the user misses notification.

(Modification 1)

Embodiment 1 has described that by displaying notification in an appropriate display device and at an appropriate timing for the user, the number of cases where the user misses the notification is reduced.

However, even if the number of cases where the user misses the notification is decreased by displaying the notification in an appropriate display device and at an appropriate timing for the user, the risk still remains that the user cannot respond to the notification and may forget the notification even after the user moves to the location that allows the user to take action, unless the user is at the location that actually allows the user to take action in response to the notification. For example, even if the user receives the notification that please recharge the electrically assisted pedal cycle when the user is outside the home, there are cases where the user cannot recharge the battery of the electrically assisted pedal cycle, and may have already forgotten recharging when the user returns to the home. Therefore, the present modification will describe a method for transmitting notification to the user who is at the location that allows the user to respond to the notification in order to reduce this risk.

Figure 13:
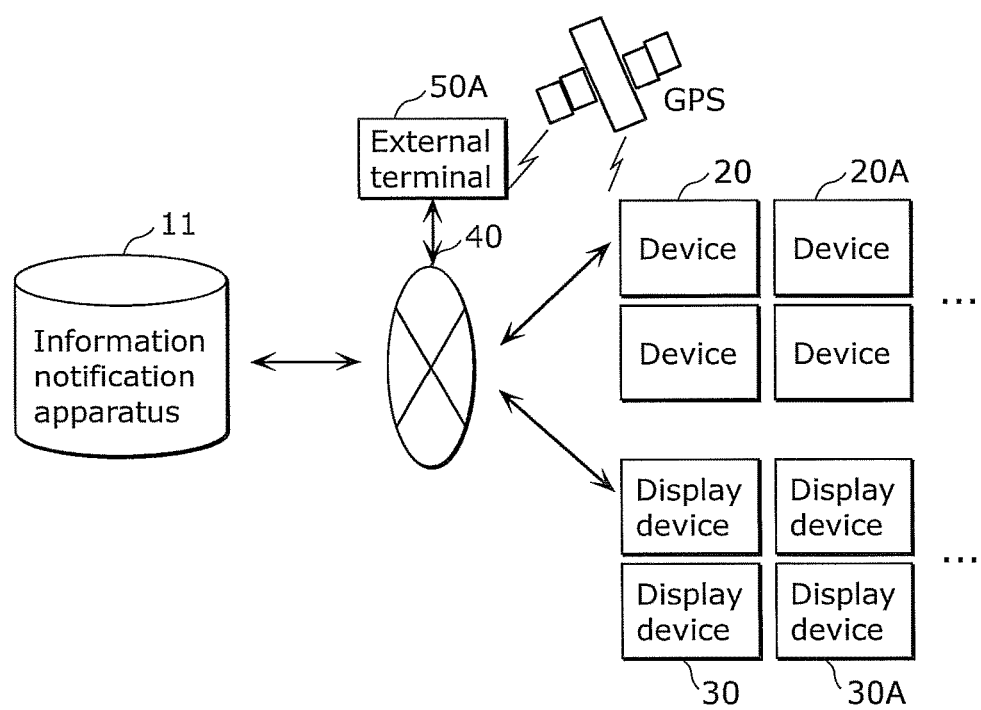
FIG. 13 is a block diagram illustrating a system configuration according to Modification 1 of Embodiment 1.

FIG. 13 is a block diagram illustrating a system configuration according to Modification 1 of Embodiment 1. The same reference signs are assigned to the same elements as those in FIG. 2B, and a description will be omitted thereof. The difference of the system configuration illustrated in FIG. 13 from the system configuration illustrated in FIG. 2B is the configurations of an information notification apparatus 11 and an external terminal 50A.

The external terminal 50A is, for example, a mobile phone (smartphone, feature phone), and a terminal which can obtain global positioning system (GPS) information.

In addition to the function of the information notification apparatus 10, the information notification apparatus 11 receives GPS information from the external terminal 50A. It should be noted that this is not limited to the case where GPS information is received from the external terminal 50A. For example, a portable device 20 mounts a function of receiving GPS information and may receive GPS information (position information). For example, when the GPS function is mounted on the electrically assisted pedal cycle, it is possible to obtain position information from the electrically assisted pedal cycle. Moreover, in this case, the external terminal 50A and the device 20 may be the same (the device 20 is a bicycle, and the external terminal 50A is also a bicycle). Since the description will be the same as that in the case where the external device 50A and the device 20 are different even if the external terminal 50A and the portable device 20 are the same, the following will describe that the external terminal 50A is different from the device 20 and the information notification apparatus 11 obtains GPS information from the external terminal 50A.

[Configuration of Information Notification Apparatus]

Figure 14:
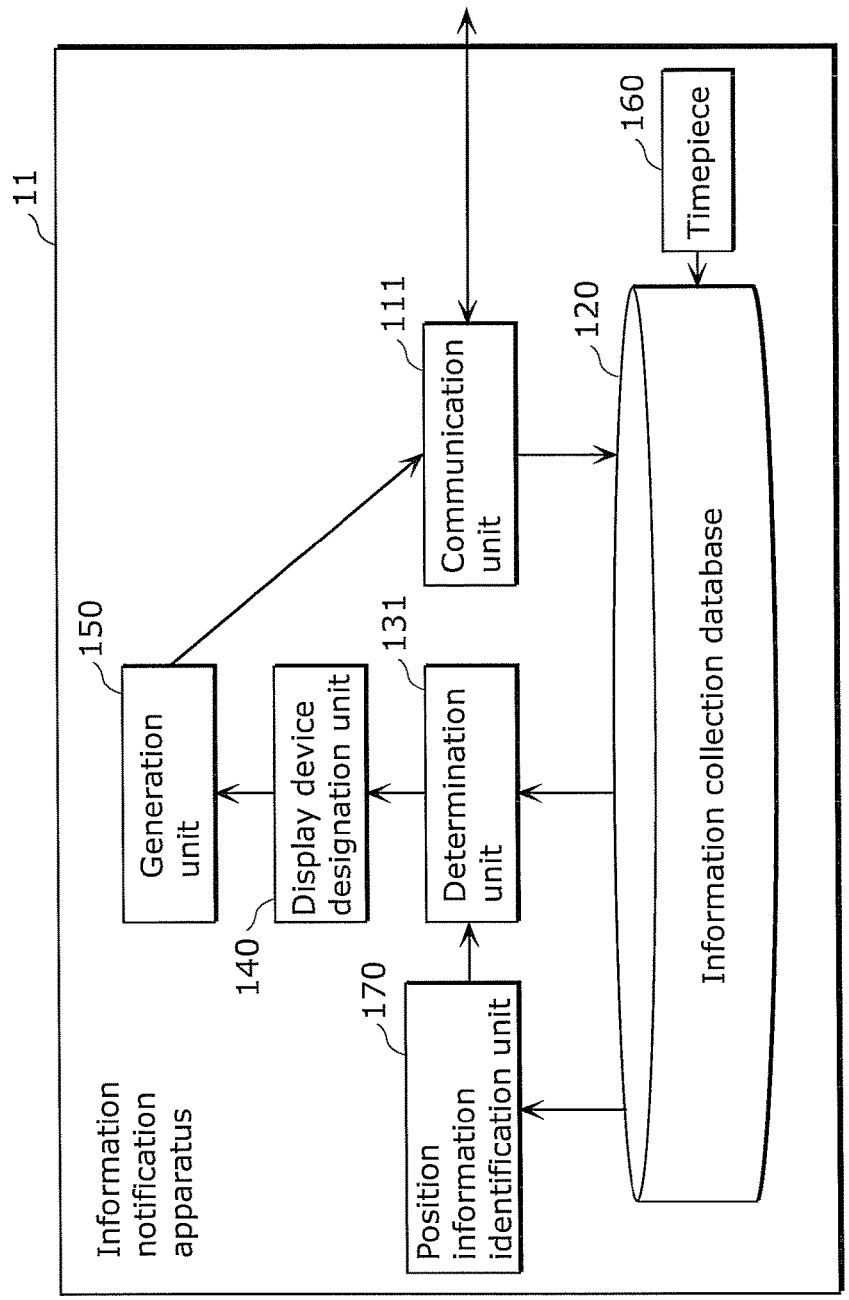
FIG. 14 is a block diagram illustrating a functional configuration of an information notification apparatus according to Modification 1 of Embodiment 1.

FIG. 14 is a block diagram illustrating a functional configuration of the information notification apparatus 11 according to Modification 1 of Embodiment 1. The same reference signs are assigned to the same elements as those in FIG. 5, and a description will be omitted thereof. The difference of the information notification apparatus 11 illustrated in FIG. 14 from the information notification apparatus 10 illustrated in FIG. 5 is the configurations of a communication unit 111 and a determination unit 131, and the inclusion of a position information identification unit 170.

The communication unit 111 includes the function of the communication unit 110. The communication unit 111 further receives GPS information from the external terminal 50A, and registers GPS information, as history information of the external terminal 50A, by associating the user information, the device information, and the history information in the external terminal 50A with the information collection database 120. It should be noted that the communication unit 111 may receive GPS information of the external terminal 50A (for example, a five-second interval), and may receive GPS information by requesting the external terminal 50A. Moreover, when time information is not included in the history information of the external terminal 50A, as similarly to Embodiment 1, the history information may be registered with time information when the history information is registered in the information collection database 120.

The position information identification unit 170 identifies the position of the user. More specifically, the position information identification unit 170 obtains the latest GPS information included in the history information of the external terminal 50A registered in the information collection database 120, and then identifies the user position information. Here, the user position information is information indication the position of the user who is inside or outside the home. It should be noted that the user position information may be a detailed address such as Oaza Kadoma, Kadoma City, Osaka Prefecture. Moreover, in the information collection database 120, the address of the user's home is registered as user information, whether the user is inside or outside the home can be identified from GPS information.

The determination unit 131 includes the function of the determination unit 130. When the information included in the first history information held in the information collection database 120 satisfies a predetermined condition and when the identified position of the user is a predetermined position that the user can respond to notification, the determination unit 131 further determines that it is necessary to transmit notification of the first device.

Specifically, the determination unit 131 determines whether or not it is necessary to generate notification, based on not only a condition that satisfies an identification condition described in Embodiment 1 but also the user position information identified by the position information identification unit 170.

It should be noted that information defining that the identified position of the user is predetermined as a position in which the user can respond to notification, that is, information determining whether or not to cause the device 20 necessary to take action (response) against notification to display notification when and where the user is located is held in association with device information of the device 20. This information, for example, makes it possible to display notification that the remaining battery level is decreasing when the user is in the home in the case where the device 20 is an electrically assisted pedal cycle. Moreover, for example, when the device 20 is an air conditioner and the user forgets turning off the air conditioner and when the user is outside the home, it is possible to display notification that the air conditioner is ON. It should be noted that the held information may be held in the determination unit 131 and in the information collection database 120.

[Method for Controlling Information Notification Apparatus]

Figure 15:
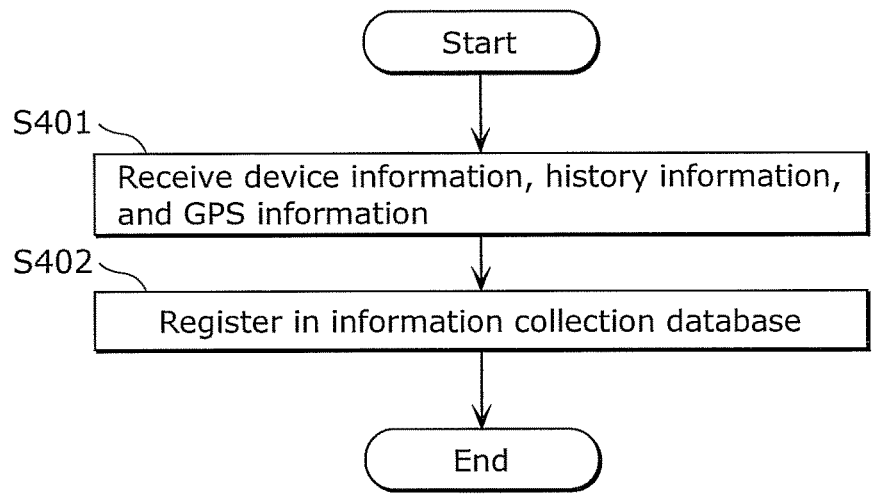
FIG. 15 is a flowchart illustrating a flow of control in an information notification apparatus according to Modification 1 of Embodiment 1.
Figure 16:
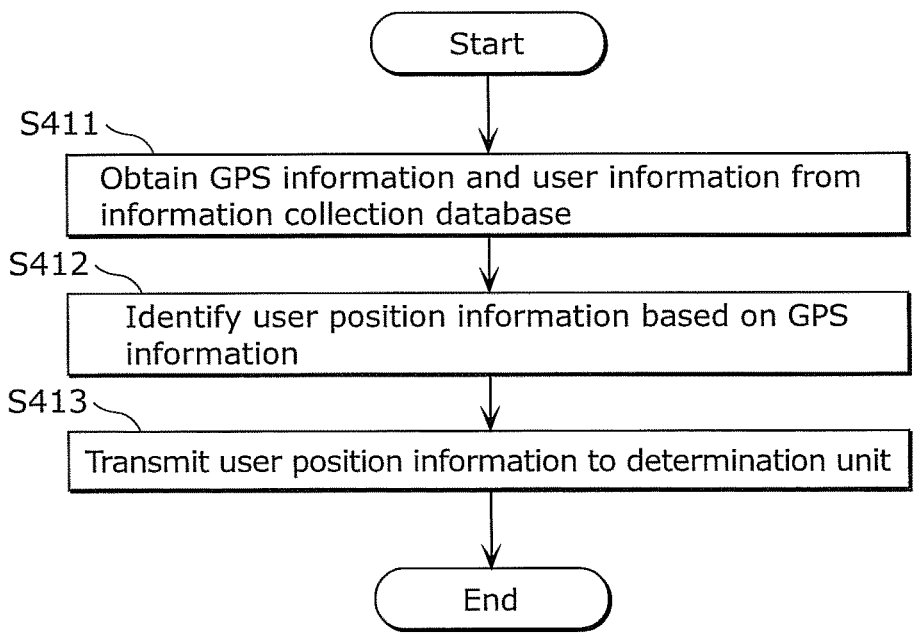
FIG. 16 is a flowchart illustrating a flow of control in an information notification apparatus according to Modification 1 of Embodiment 1.
Figure 17:
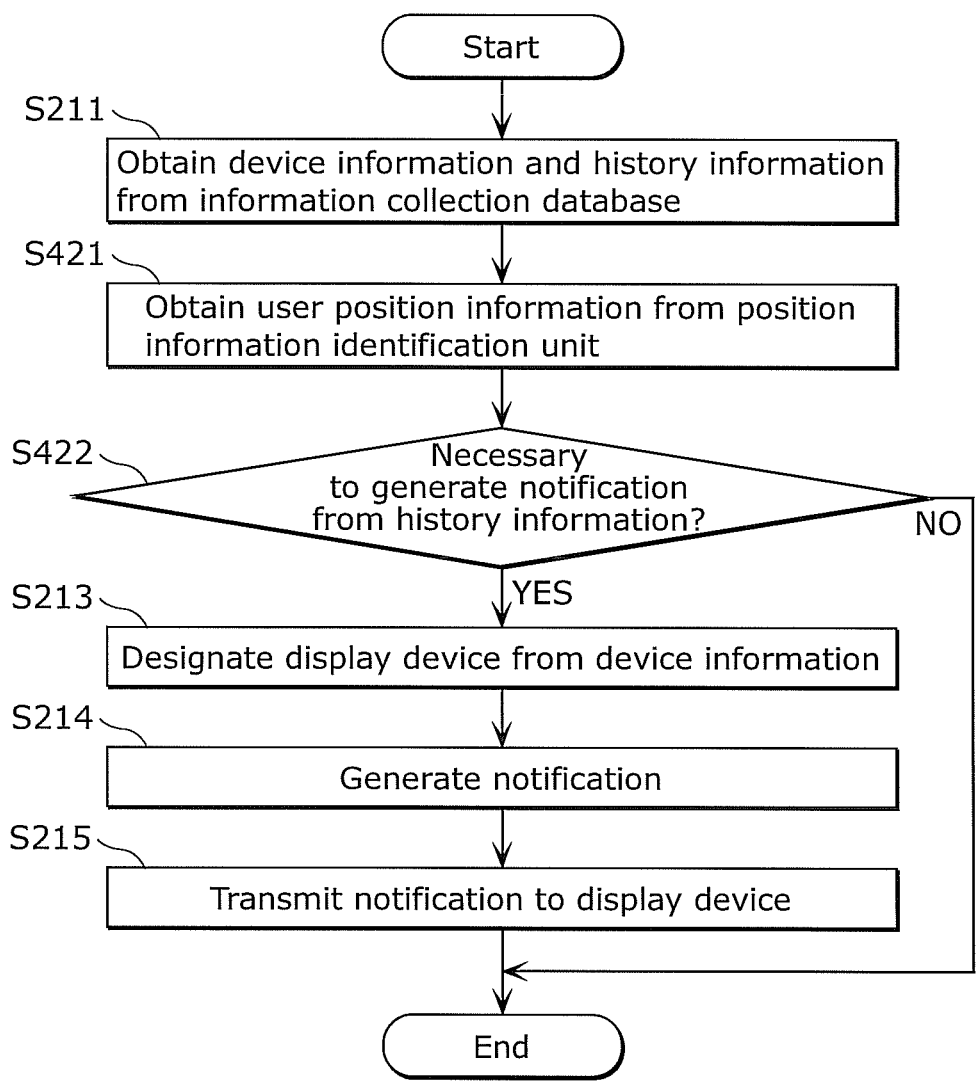
FIG. 17 is a flowchart illustrating a flow of control in an information notification apparatus according to Modification 1 of Embodiment 1.

The following will describe a method for controlling the above described information notification apparatus 11 with reference to FIGS. 15 and 17. FIGS. 15 to 17 are each a flowchart illustrating a flow of control in the information notification apparatus 11 according to Modification 1 of Embodiment 1. The same reference signs are assigned to the same steps as those in FIGS. 9A and 9B, and a description will be omitted thereof.

First, the communication unit 111 receives history information and device information of the device 20 from the device 20, and device information and GPS information of the external terminal 50A from the external terminal 50A (S401).

Next, the communication unit 111 registers, based on each device information, history information, GPS information, and device information in the information collection database 120 by associating the history information, the GPS information, and the device information with the user information (S402).

Moreover, the information notification apparatus 11 performs the process illustrated in FIGS. 16 and 17 in parallel with the control described using FIG. 15.

In other words, first, as illustrated in FIG. 16, the position information identification unit 170 obtains GPS information and address information that is user information (S411). Next, the position information identification unit 170 identifies the user position information based on the obtained GPS information (S412). Then, the identified position information is transmitted to the determination unit 131 (S413).

Moreover, as illustrated in FIG. 17, in S421, the determination unit 131 obtains the user position information transmitted from the position information identification unit 170. Next, the determination unit 131 determines whether or not it is necessary to generate notification not only from a combination of (i) identification information included in the history information and (ii) a condition but also from the user position information (S422). For example, when the device 20 is an electrically assisted pedal cycle, the determination unit 131 determines that it is necessary to generate notification in the case where the remaining battery level is no more than 20% and the user is in the home.

It should be noted that a description will be omitted since S213 or later are the same as those described above.

[Advantageous Effects]

As described above, with the present modification, it is possible to realize the information notification apparatus 11 which makes it possible to provide notification in an appropriate display location and at an appropriate timing.

More specifically, the information notification apparatus 11 can display notification when the user is an appropriate location allowing the user to respond to notification, by identifying the position of the user by the position information identification unit 170. With this, the user is able to easily take action against notification and reduce the risk of forgetting notification.

(Modification 2)

Figure 18:
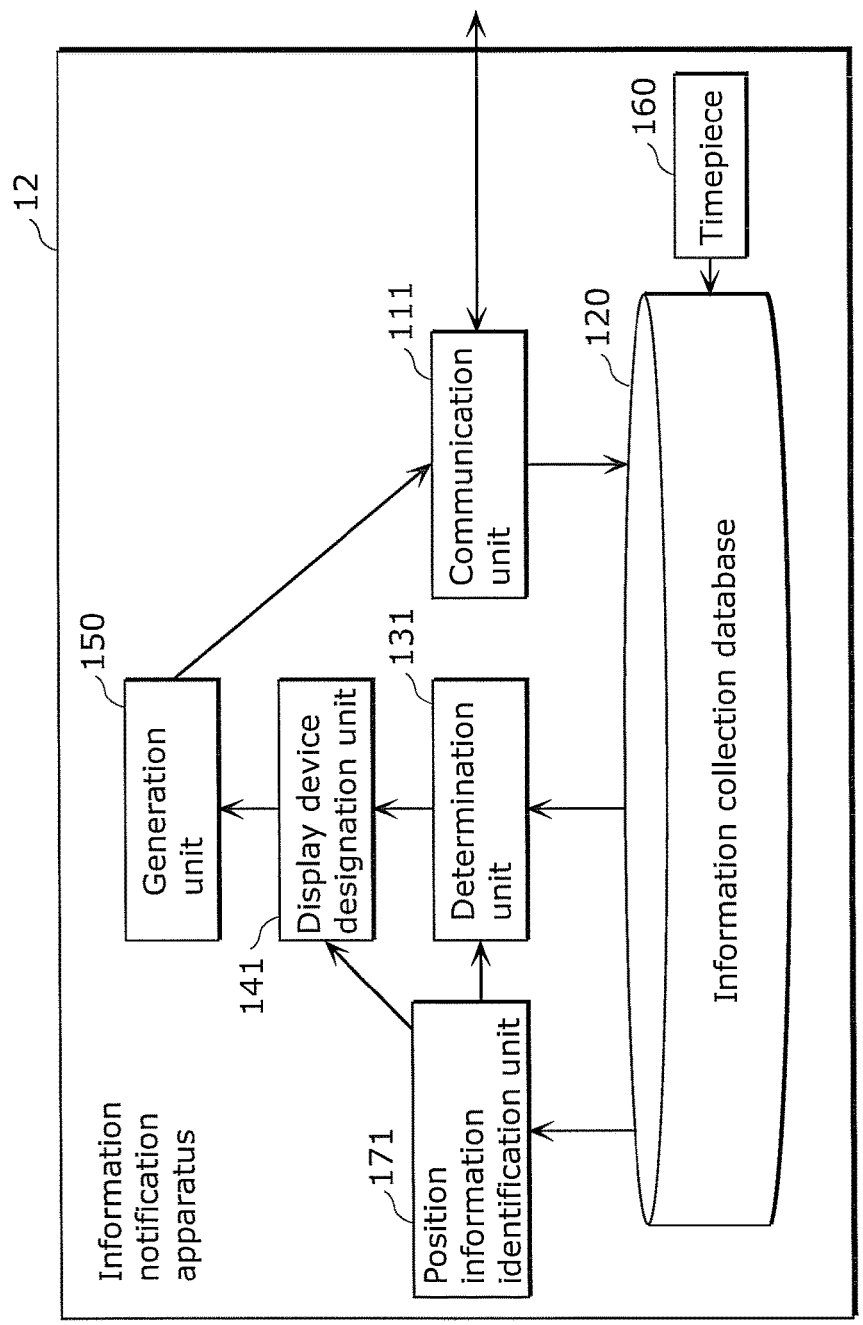
FIG. 18 is a diagram illustrating a modification of a block diagram illustrating a functional configuration of an information notification apparatus according to Modification 2 of Embodiment 1.

The present modification will describe an information notification apparatus different from that according to Modification 1 with reference to FIG. 18.

FIG. 18 is a block diagram illustrating an information notification apparatus 12 according to Modification 2 of Embodiment 1. The same reference signs are assigned to the same elements as those in FIGS. 5 and 14, and a description will be omitted thereof. The difference of the information notification apparatus 12 illustrated in FIG. 18 from the information notification apparatus 11 illustrated in FIG. 14 is the configurations of a position information identification unit 171 and a display device designation unit 141.

The position information identification unit 171 identifies the second device having history information including time information temporally closest to the current among the devices, by referring to control information included in the history information of the devices that are held in the information collection database 120.

More specifically, the position information identification unit 171 includes the function of the position information identification unit 170, and further identifies the device having the latest control information by referring to the control information included in history information of one or more devices which can serve as the role of the display device 30 among the devices including the device 20.

For example, a television and a mobile phone are each a device which is the device 20 and can serve as the role of display device 30. When the user operates a television that is the device 20, the position information identification unit 171 identifies that the control information of the television is the latest. In other words, by identifying the device having the control information operated at the time closest to the current time, the position information identification unit 171 can predict that the user is operating the identified device or near the identified device.

The display device designation unit 141 further designates the second device as the display device to which notification of the first device should be transmitted when the second device identified by the position information identification unit 171 has a display function.

More specifically, the display device designation unit 141 has the function of the display device designation unit 140. The display device designation unit 141 further designates, as the display device 30, the device 20 which can also serve as the role of the display device 30 identified by the position information identification unit 171. For example, the device 20 is an electrically assisted pedal cycle, and the display device 30 is a mobile phone. When the device having the latest control information is identified as a television by the position information identification unit 171, the display device designation unit 141 designates the television instead of the mobile phone as the display device 30. With this, notification is displayed on the television.

[Advantageous Effects]

As described above, with the present modification, it is possible to realize the information notification apparatus 12 which makes it possible to provide notification in an appropriate display location and at an appropriate timing.

More specifically, the information notification apparatus 12 can predict that the user is operating the identified device or near the identified device, by identifying the device which is operated at the time closest to the current time by the position information identification unit 171. Thus, the display device designation unit 141 can more efficiently transmit notification to the user since notification is displayed on the designated device by designating the identified device by the position information identification unit 171. For example, when the user is watching the television, it is definitely possible to convey notification to the user by displaying notification on the television.

(Modification 3)

The present modification will describe an information notification apparatus and a display device different from those according to Embodiment 1 with reference to FIGS. 19 to 22.

[Configuration of Information Notification Apparatus]

Figure 19:
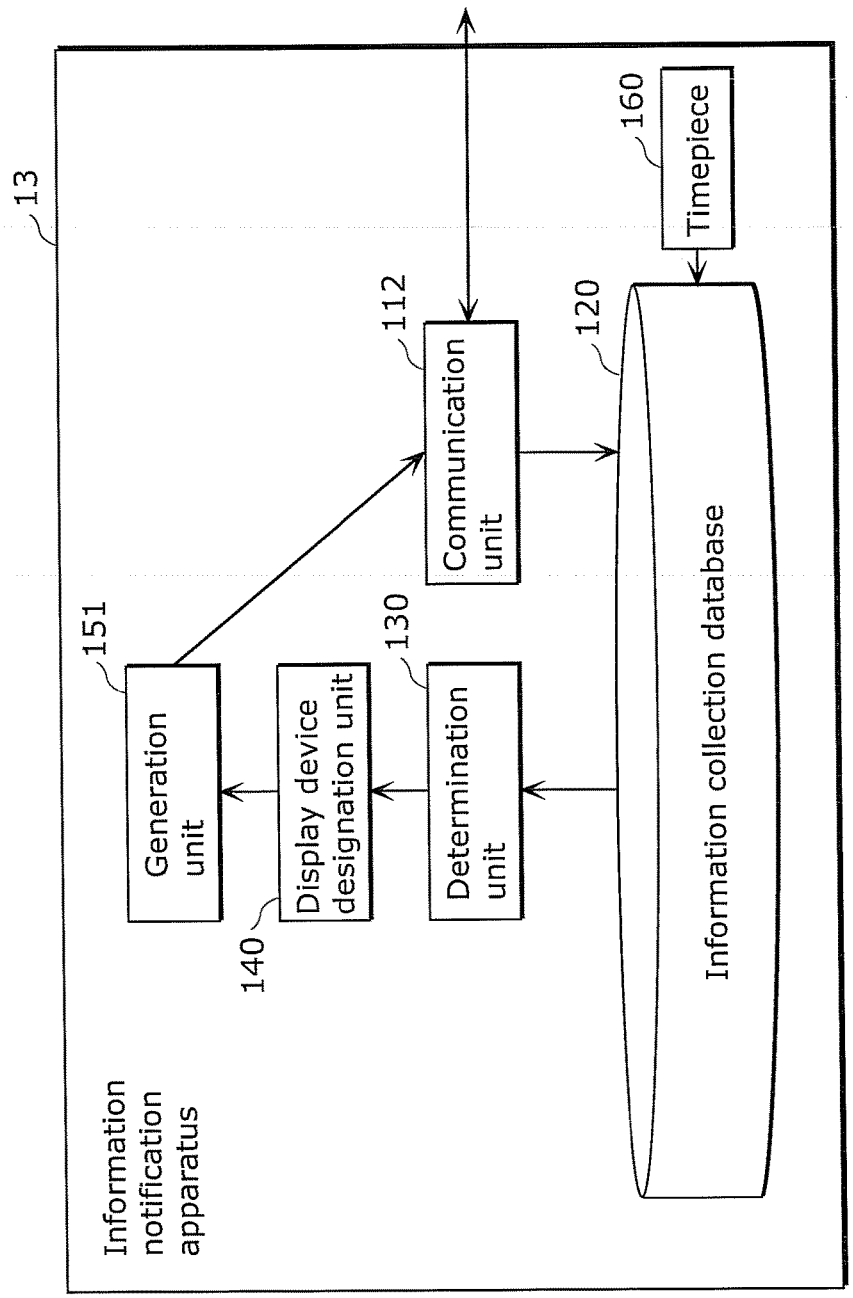
FIG. 19 is a block diagram illustrating a functional configuration of an information notification apparatus according to Modification 3 of Embodiment 1.

FIG. 19 is a block diagram illustrating a functional configuration of an information notification apparatus according to Modification 3 of Embodiment 1. The same reference signs are assigned to the same elements as those in FIG. 5, and a description will be omitted thereof. The difference of an information notification apparatus 13 illustrated in FIG. 19 from the information notification apparatus 10 illustrated in FIG. 5 is the configurations of a communication unit 112 and a generation unit 151.

The generation unit 151 includes the function of the determination unit 150. The generation unit 151 further generates not only notification but also a control command of the device 20. For example, when the device 20 is an air conditioner, the generation unit 151 generates not only notification indicating that "Do you forget to turn off the air conditioner?" but also notification including notification to encourage the control of device 20 that "Do you turn off the air conditioner? Yes or No". Then, the generation unit 151 simultaneously generates a control command to control the device 20 when "Yes" is pushed down in response to the notification which encourages the control.

The communication unit 112 transmits not only notification but also a control command of the device 20 to the display device 31. Furthermore, the communication unit 112 may transmit not only notification but also an operation command to the display device 31.

[Configuration of Display Device]

Figure 20:
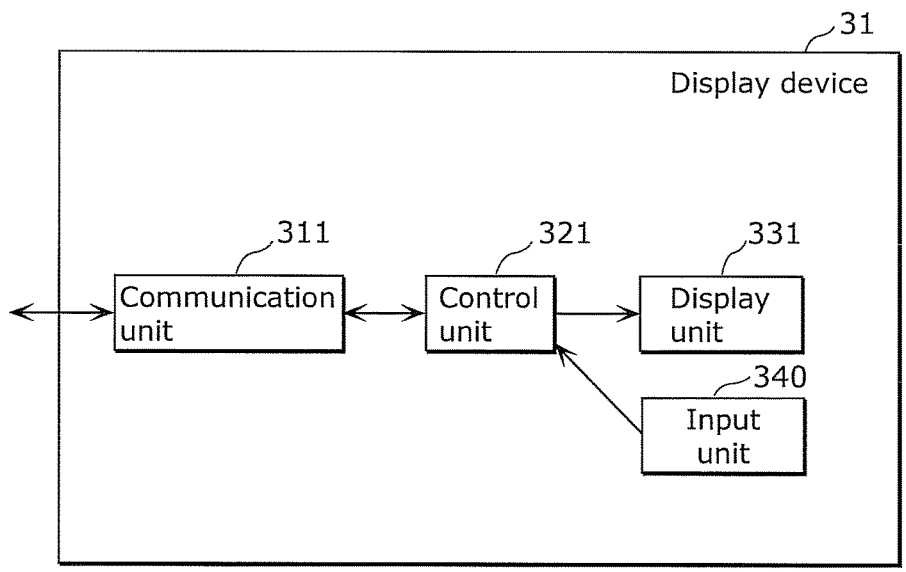
FIG. 20 is a block diagram illustrating a functional configuration of a display device according to Modification 3 of Embodiment 1.

FIG. 20 is a block diagram illustrating a functional configuration of a display device according to Modification 3 of Embodiment 1. The difference of the display device 31 illustrated in FIG. 20 from the display device 30 illustrated in FIG. 4 is the configurations of a communication unit 311, a control unit 321, and a display unit 331, and the inclusion of an input unit 340.

The communication unit 311 receives notification and a control command from the information notification apparatus 13.

The control unit 321 causes the display unit 331 to display the received notification. In the present modification, the control unit 321 displays notification which encourages the user to operate the device 20.

Moreover, the control unit 321 transmits a control command for the device 20 generated based on the information input from the user in the input unit 340, from the communication unit 311 via the network 40 to the device 20.

The display unit 331 displays notification which encourages the user to operate the device 20.

The input unit 340 receives an input by the user based on the content displayed on the display unit 331.

[Method for Controlling Information Notification Apparatus]

Figure 21:
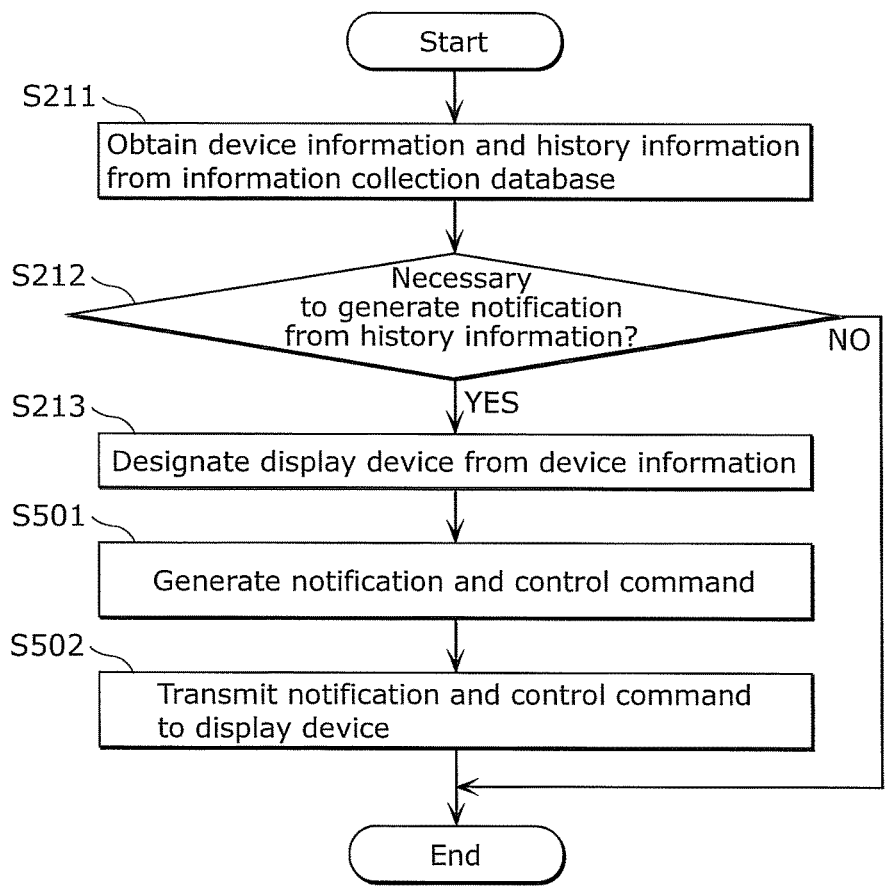
FIG. 21 is a flowchart illustrating a flow of control in an information notification apparatus according to Modification 3 of Embodiment 1.

The following will describe a method for controlling the above described information notification apparatus 13 with reference to FIG. 21.

FIG. 21 is a flowchart illustrating a flow of control in the information notification apparatus 13 according to Modification 3 of Embodiment 1. The same reference signs are assigned to the same steps as those in FIGS. 9A and 9B, and a description will be omitted thereof.

First, a description of S211 to S213 will be omitted because they have been already described.

Next, in S501, the generation unit 151 generates notification to be displayed on the designated display device and a control command to control the display device 31 (S501).

Next, the communication unit 112 transmits the notification and the control command generated by the generation unit 150 to the display device designated by the display device designation unit 140 (S502).

[Method for Controlling Display Device]

Figure 22:
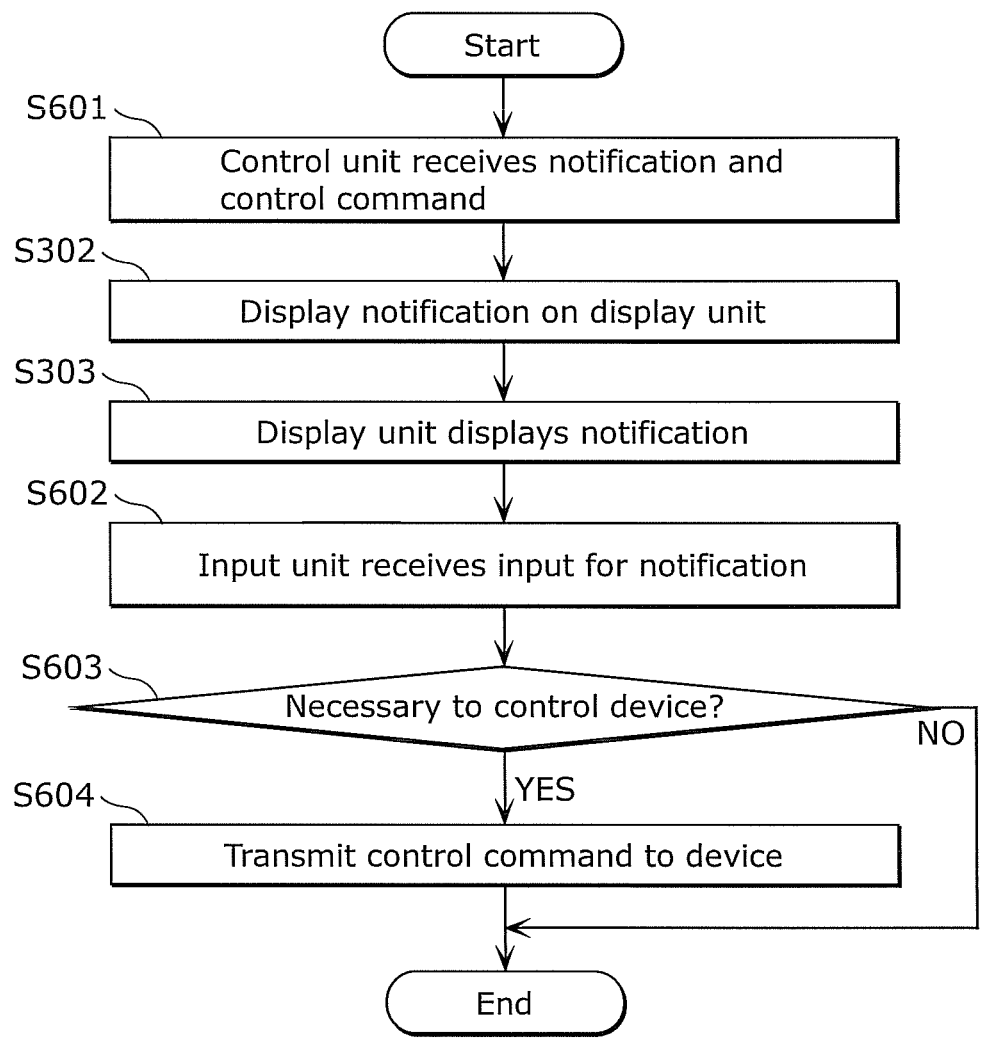
FIG. 22 is a flowchart illustrating a flow of control in an information notification apparatus according to Modification 3 of Embodiment 1.

The following will describe a method for controlling the above described display device 31 with reference to FIG. 22.

FIG. 22 is a flowchart illustrating a flow of control in the display device 31 according to Modification 3 of Embodiment 1. The same reference signs are assigned to the same steps as those in FIG. 10, and a description will be omitted thereof.

First, the communication unit 311 receives notification and a control command of the device 20 from the information notification apparatus 13 (S601).

Next, the control unit 321, as described above, causes the display unit to display notification on receipt of the notification (S302), and the display unit 331 displays notification on the display unit 331, on receipt of the command of the control unit 321 (S303).

Next, the input unit 340 receives an input operation of the user based on notification displayed on the display unit 331 (S602).

Next, the control unit 321 determines whether or not it is necessary to transmit, to the device 20, the control command generated based on the input information received by the input unit 340 (S603).

When the control unit 321 determines that it is not necessary to transmit the control command to the device 20 (NO in S603), the series of the processes is ended. Meanwhile, when the control unit 321 determines that it is necessary to transmit the control command to the device 20 (YES in S603), the communication unit 311 transmits the control command to the device 20 (S604).

[Advantageous Effects]

As described above, with the present modification, it is possible to realize the information notification apparatus 13 which makes it possible to provide notification in an appropriate display location and at an appropriate timing.

More specifically, the information notification apparatus 13 can simultaneously control the device 20 when the user receives notification, by generating the control command of the device 20 by the generation unit 151.

Embodiment 2

Embodiment 2 will be described by taking a washing machine and an illumination device as an example of the device 20 and a smartphone as an example of the display device 30.

[Configuration of Information Notification Apparatus]

Figure 23:
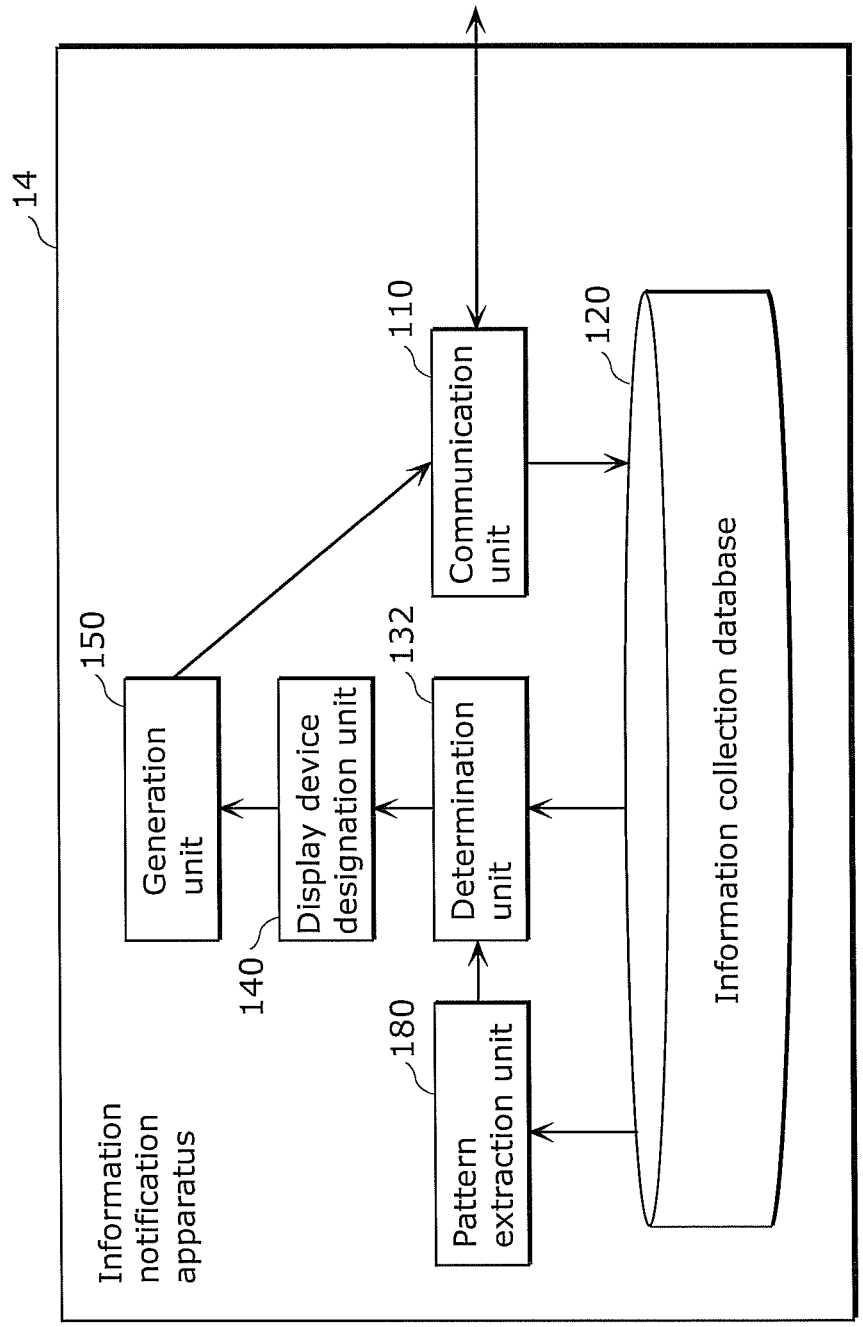
FIG. 23 is a block diagram illustrating a functional configuration of an information notification apparatus according to Embodiment 2.

FIG. 23 is a block diagram illustrating a functional configuration of an information notification apparatus according to Embodiment 2. It should be noted that the same reference signs are assigned to the same elements as those in FIG. 5, and a description will be omitted thereof. The difference of an information notification apparatus 14 illustrated in FIG. 23 from the information notification apparatus 10 illustrated in FIG. 5 is the configuration of a determination unit 132 and the inclusion of the configuration of a pattern extraction unit 180.

The pattern extraction unit 180 extracts a use pattern when the user uses the first device by referring to the first history information held in the information collection database 120.

More specifically, the pattern extraction unit 180 extracts an action habit (action pattern) when the user uses the device from history information of various devices of the user that are stored in the information collection database 120 and time information included in the history information. For example, the use pattern of the extracted device includes the action habit of the user who operates the washing machine before going to bed, and a use-specific action habit (action pattern) in which the user drives the electrically assisted pedal cycle over a long distance and therefore recharges the battery when the remaining battery levels is no more than 30%.

It should be noted that the pattern extraction unit 180 extracts a use pattern of the user by data mining technique such as correlation analysis and time series analysis. Moreover, the timing when the pattern extraction unit 180 extracts a use pattern may be the timing when the manager of the information notification apparatus 14 designates, and extracts the use pattern at an equal interval (for example, once in a week).

The determination unit 132 includes the function of the determination unit 130. The determination unit 132 further determines, from the first history information, that it is necessary to transmit notification which encourages the user to use the first device indicated by the use pattern, when determining that the first device indicated by the use pattern extracted by the pattern extraction unit 180 is not used. Then, the generation unit 150 generates notification which encourages the user to use the first device, and the communication unit 110 transmits the generated notification to the display device designated by the display device designation unit 140.

More specifically, the determination unit 132 obtains history information of the device 20 from the information collection database 120, and obtains a use pattern related to the device 20 (a user pattern of the user using the device 20) from the pattern extraction unit 180. The determination unit 132 obtains history information related to the obtained use pattern and time information included in the history information. For example, when the device 20 is a washing machine and when the determination unit 132 obtains history information of the washing machine and obtains a use pattern of the washing machine from the pattern extraction unit 180, the user pattern indicates the user action habit in which the owner/user of the washing machine does the laundry before going to bed (before all illumination devices are turned off and at 23:00 or later). In this case, since the determination unit 132 determines, from this use pattern, that the washing machine is used before the user goes to bed, and therefore further obtains history information of illumination.

Moreover, the determination unit 132 determines that it is necessary to generate notification when determining, from the identification information included in the history information of the device 20, that the user is not using the device 20 indicated by the obtain use pattern (when determining that the obtained use pattern is different from the current use). Here, the identification information is information included in the history information of the washing machine, such as the information of power source of the washing machine. Moreover, the washing machine that is the device 20 indicated by the use pattern is not used, which means that the washing machine is not turned on although all illumination devices are turned off. In this case, the determination unit 132 can determine that it is necessary to generate notification because the determination unit 132 can determine that the user forgets to do the laundry. As described above, when determining that the device 20 indicated by the use pattern is not used from the history information of the device 20, the extracted use pattern, and the history information or time information of another device related to the device 20, the determination unit 132 can determine that it is necessary to generate notification.

[Method for Controlling Information Notification Apparatus]

Figure 24:
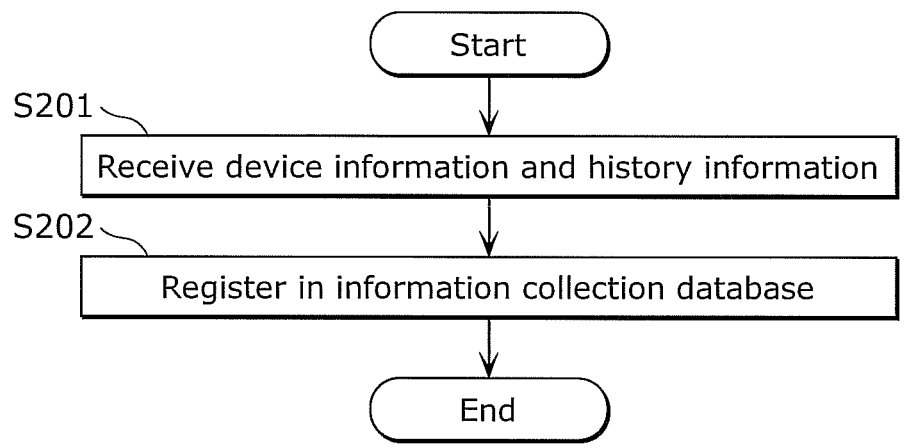
FIG. 24 is a flowchart illustrating a flow of control in an information notification apparatus according to Embodiment 2.
Figure 25:
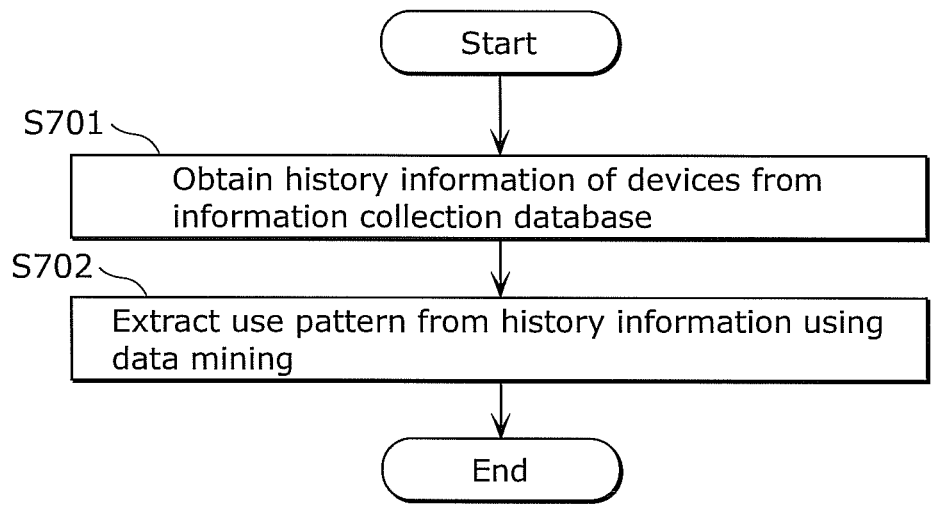
FIG. 25 is a flowchart illustrating a flow of control in an information notification apparatus according to Embodiment 2.
Figure 26:
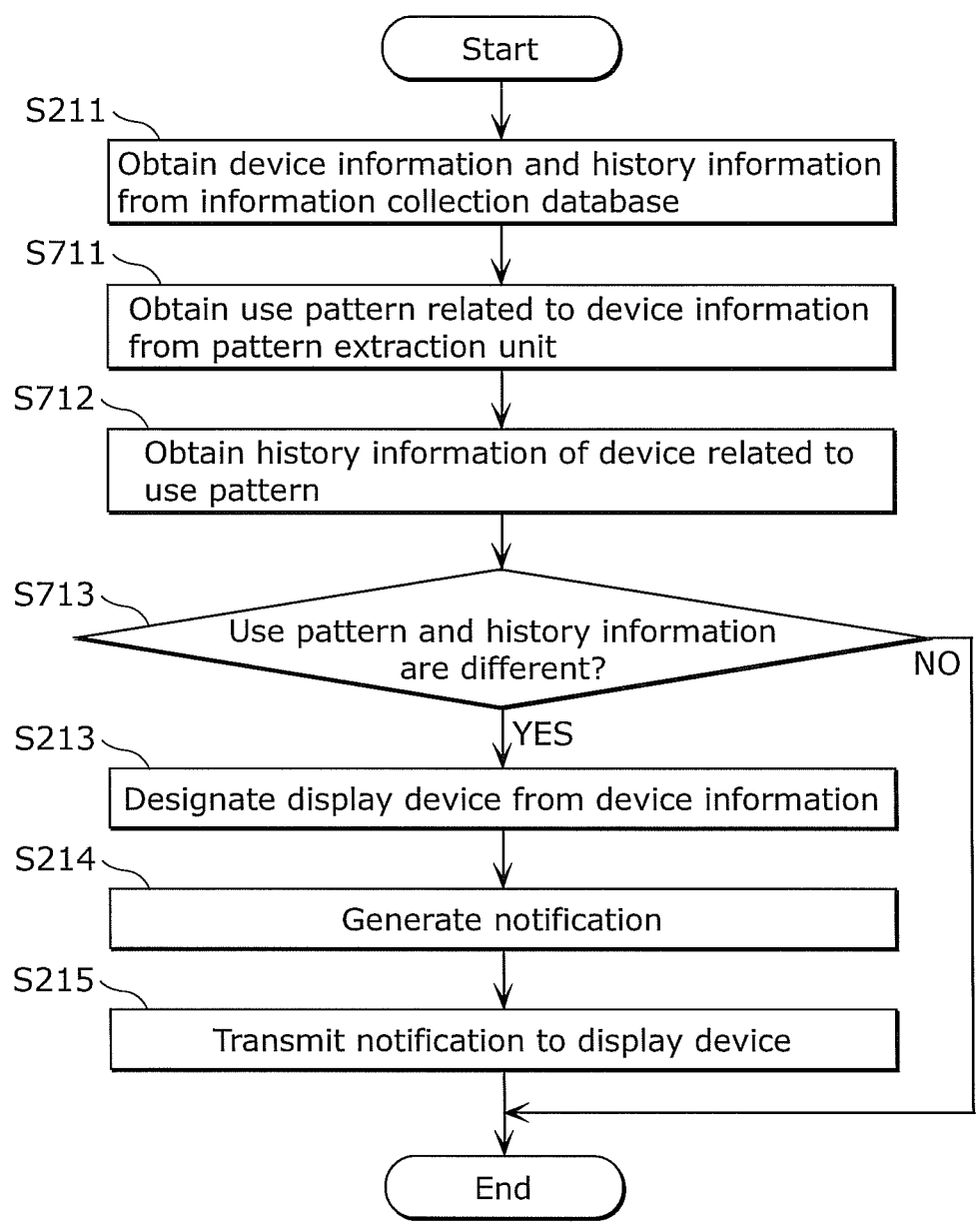
FIG. 26 is a flowchart illustrating a flow of control in an information notification apparatus according to Embodiment 2.

Next, a method for controlling the above described information notification apparatus 14 will be described with reference to FIGS. 24 to 26. FIGS. 24 to 26 are each a flowchart illustrating a flow of control in the information notification apparatus 14 according to Embodiment 2. The same reference signs are assigned to the same steps as those in FIGS. 9A and 9B, and a description will be omitted thereof.

The flow of control illustrated in FIG. 24 is the same as that described in FIG. 9A, and therefore a description will be omitted thereof.

The information notification apparatus 14 performs the process illustrated in FIGS. 25 and 26 in parallel with the control described using FIG. 24. In other words, first, the pattern extraction unit 180 obtains history information of the devices from the information collection database 120 (S701 in FIG. 25).

Next, the pattern extraction unit 180 extracts a use pattern using a data mining technique (S702).

In other words, first, the determination unit 132 obtains history information and device information from the information collection database 120 (S211).

Next, the determination unit 132 obtains, from the pattern extraction unit 180, a use pattern related to the device information obtained from the information collection database 120 (S711).

Next, the determination unit 132 obtains, by referring to the obtained user pattern, information of another device related to the user pattern, and history information or time information (S712).

Next, the determination unit 132 determines whether or not the obtained use pattern and the obtained history information are different from each other (S713). Specifically, the determination unit 132 determines whether or not the device indicated by the obtained use pattern is not used.

The determination unit 132 ends the series of flow when the obtained pattern and the obtained history information are the same (NO in S713).

Meanwhile, when the obtained use pattern and the obtained history information are different (YES in S713), the display device designation unit 140 designates the display device from the device information (S213).

Next, the generation unit 150 generates notification to be displayed on the designated display device (S214). The communication unit 110 transmits the notification generated by the generation unit 150 to the display device designated by the display device designation unit 140 (S215).

[Advantageous Effects]

As described above, with the present embodiment, it is possible to realize the information notification apparatus 14 which makes it possible to provide notification in an appropriate display location and at an appropriate timing.

More specifically, the information notification apparatus 14 can convey notification in a timing and a condition suitable to an individual user by extracting a user-specific use pattern with the pattern extraction unit 180. With this, it is possible for the user to receive notification at a more appropriate timing.

As described above, with the present embodiment, it is possible to realize the information notification apparatus which makes it possible to provide notification in an appropriate display location and at an appropriate timing.

1) It should be noted that in the above described embodiments, each of the structural elements may be configured with dedicated hardware or a software program suitable for each of the structural elements. Each of the structural elements may be implemented when a program execution unit such as CPU or a processor is executed by reading a software program recorded on a recording medium such as hard disk or a semiconductor memory. Here, the software implementing the information notification apparatus according to each of the embodiments is a program as follows.

In other words, this program causes a computer to execute: receiving, from a first device among a plurality of devices which operate on receipt of an input from a user, a first device information item uniquely identifying the first device, and first history information of the first device, the first history information including at least one of a control information item of the first device and a state information item indicating a state of the first device; holding, in association with each other, information of the user owning the first device and the first device information item, and holds, based on the first device information item received by the communication unit, the received first history information in association with the received first history information to the held first device information item; determining that it is necessary to transmit notification of the first device when information included in the first device information held in the information collection database satisfies a predetermined condition; holding destination information indicating one or more display devices to which notification of each of the devices is to be transmitted, and designating, based on the destination information and the received first device information, a display device on which the notification of the first device among the devices is to be displayed; and generating the notification when the determination unit determines that it is necessary to transmit the notification of the first device, wherein in the receiving, the generated notification is transmitted to the display device designated by the display device designation unit.

Moreover, in each of the embodiments, a display of the notification may be realized with a method. For example, it is possible that the method is an information displaying method in a system which controls a plurality of devices each of which operates on receipt of an input from a user, an information notification apparatus which obtains an information item about an operation state from each of the devices, and a plurality of display devices each of which obtains and displays an information item about an operation state of at least a first device among the devices from the information notification apparatus, the information displaying method including: determining that it is necessary to notify the information item about the operation state of the first device when the information item about the operation state of the first device satisfies a predetermined condition; notifying an operation state of the first device among the display devices by designating a first display device on which notification is to be displayed; and displaying the notified information item about the operation state of the first device on the designated first display device.

Here, for example, it is possible that the information displaying method further includes: determining that it is necessary to notify an information item about an operation state of a second device when the information item about the operation state of the second device among the devices satisfies a predetermined condition, the second device being different from the first device; performing notification of an operation state of the second device among the display devices by designating a second display device on which the notification is to be displayed, the second display device being different from the first device; and displaying the notified information item about the operation state of the notified second device on the designated second device.

Moreover, for example, it is possible that the information displaying method further includes displaying, on the first display device, that the operation state of the second device is displayed on the second display device, along with an information item about the notified operation state of the first device.

Moreover, for example, it is possible that the information displaying method further includes: displaying, on a screen of the first display device, a list of icons indicating the display devices owned by the user and a list of icons indicating the devices owned by the user; and receiving, in the screen, a user operation of associating the icon indicating the first device with the icon indicating the first display device, to designate the first display device as a display device on which notification of the operation state of the first device is to be displayed, among the display devices.

2) In each of the embodiments, the case where the device is a household electrical appliance used by the households is described. However, the device may be an industrial device used at a factory, such as a machine tool.

3) In each of the embodiments, the information notification apparatus is a Web server owned by a maker and the like. However, the information notification apparatus may be a household server installed in the home.

4) Although each of the embodiments illustrates a configuration in which the information collection database 120 is included in the information notification apparatus, the information collection database 120 may be a database installed outside the information notification apparatus.

5) Although each of the embodiments describes that destination information illustrated in FIG. 7 is set to the user of the information notification apparatus 10 or the device 20, the destination information is not set only to the user. The maker which provides the information notification apparatus 10 and the like may set destination information as initial setting. In that case, the maker may set, as initial setting, destination information such that when the device 20 is an electrically assisted pedal cycle, a television is the display device, and when the device 20 is an air conditioner, a smartphone is the display device.

6) Moreover, when the user sets destination information, the use may be able to watch the list of own devices registered in the information collection database 120 from the smartphone and the personal computer, and may select the display device of notification for each of the registered devices. In this case, the display device includes a database information obtainment unit and an input unit. More specifically, the display unit displays the obtained device information, and the input unit receives a user operation. On receipt of a command of obtaining database information from the input unit, the database information obtainment unit requests the information collection database 120 for the device list information owned (held) by the user. When the user selects the display device which displays notification for the device in the input unit, the information notification apparatus collects this information and updates the content of the display device designation unit.

Here, an example of the case where when the smartphone that is also the display device displays the list of own devices as an icon, the user selects the display device of notification for each of the devices will be described with reference to FIGS. 27 and 28.

Figure 27:
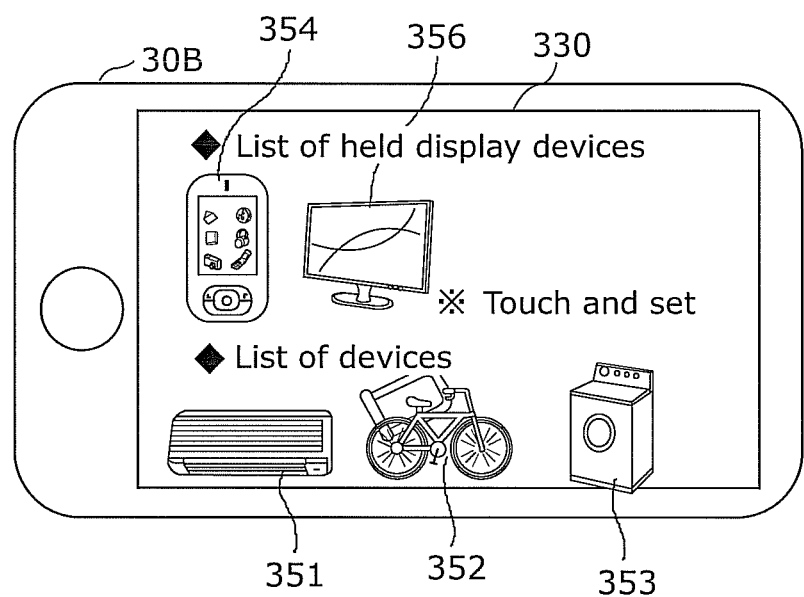
FIG. 27 is a diagram illustrating an example of a display screen in which a display device candidate and a device are displayed with icons.

FIG. 27 is a diagram illustrating an example of a display screen in which a display device candidate and a device are displayed with icons. FIG. 28 is a diagram for explaining an example of setting destination information on the display in FIG. 27.

In the example illustrated in FIG. 27, the list of devices is displayed with an icon for each of the devices on the display unit 330 of the smartphone that is also the display device 30B, and the list of display devices owned (held) by the user is displayed with an icon indicating each of the display devices. Specifically, in the example illustrated in FIG. 27, as the device, an icon 351 of the air conditioner, an icon 352 of the electrically assisted pedal cycle, an icon 353 of the washing machine are displayed, and as the display device, an icon 354 of the smartphone, and an icon 356 of the television are displayed.

In this case, for example, when the user wants to set, to the smartphone, the display device on which notification for the electrically assisted pedal cycle should be displayed, as illustrated in (a) to (b) in FIG. 28, the user drags the icon 352 of the electrically assisted pedal cycle on the display unit 330 and then superimposes the icon 352 of the electrically assisted pedal cycle on the icon 354 of the smartphone. With this, the smartphone is set as the display device which displays notification for the electrically assisted pedal cycle. At this time, as illustrated in (c) in FIG. 28, for example, it may be set such that in the display unit 330, the icon 352b of the electrically assisted pedal cycle is superimposed on an icon 354 with a smaller size of the electrically assisted pedal cycle icon.

It should be noted in (c) in FIG. 28, since an icon 351c of the air conditioner is displayed to be superimposed on the icon 356 of the television with a smaller size of the air conditioner icon, it is found that the television is set as the display device which displays notification for the air conditioner.

7) A method for setting (selecting) the display device of notification is not limited to the example of the above described 6). For example, the smartphone that is also the display device 30B may display information which encourages the display device to be selected.

Figure 29A:
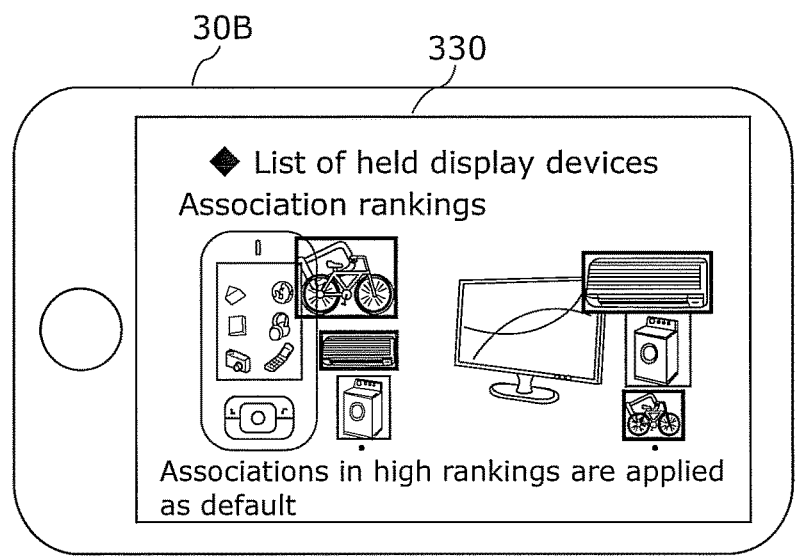
FIG. 29A is a diagram illustrating an example of a display screen in which an icon of a display device candidate is displayed for each device icon.
Figure 29B:
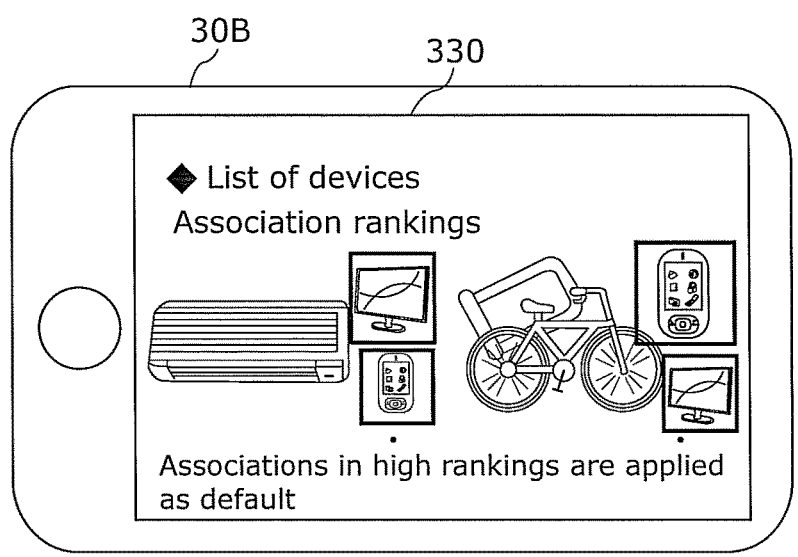
FIG. 29B is a diagram illustrating an example of a display screen on which an icon of a display device candidate is displayed for each device icon.

FIGS. 29A and 29b are each a diagram illustrating an example of a display screen in which an icon of a display device candidate is displayed for each device icon. In other words, as illustrated in FIG. 29A, a candidate of the device to be selected as destination of notification may be displayed with an icon near the icon of the display device owned (held) by the user. Moreover, as illustrated in FIG. 29B, a candidate of the display device to which notification corresponding to the device is transmitted may be displayed, with an icon, near the icon of the device.

In the example illustrated in FIG. 29A, the devices frequently selected by the user are displayed in rankings, based on the performance of the providing side (maker) of the information notification apparatus 10 and the like and the history in which the user performed in the past, and the devices in high rankings are associated with defaults. More specifically, the smartphone is selected by default as a display device which displays notification for the electrically assisted pedal cycle, and the television is selected by default as a display device which displays notification for the air conditioner. In the example illustrated in FIG. 29B, the devices frequently selected by the user are displayed in rankings, based on the performance of the providing side (maker) of the information notification apparatus 10 and the like and the history in which the user performed in the past, and the devices in high rankings are associated with defaults. More specifically, the smartphone is selected by default as a display device which displays notification for the electrically assisted pedal cycle, and the television is selected by default as a display device which displays notification for the air conditioner.

With this, the user can easily select the display device for each device on the display unit 330.

8) Although each of the embodiments describes the example of the case where destination information illustrated in FIG. 7 is set by the user of the information notification apparatus 10 or the device 20, the destination information is not set only by the user. For example, even when the destination information is set by the user, the destination information may be set to be displayed on the display device frequently designated by the information notification apparatus 10 and the like.

In other words, for example, when the television is generally designated as the device which displays notification for the air conditioner, notification may be displayed on the television by designating not only the display device set by the user but also the television as the display device.

Here, the configuration of the information notification apparatus realizing this will be described.

Figure 30:
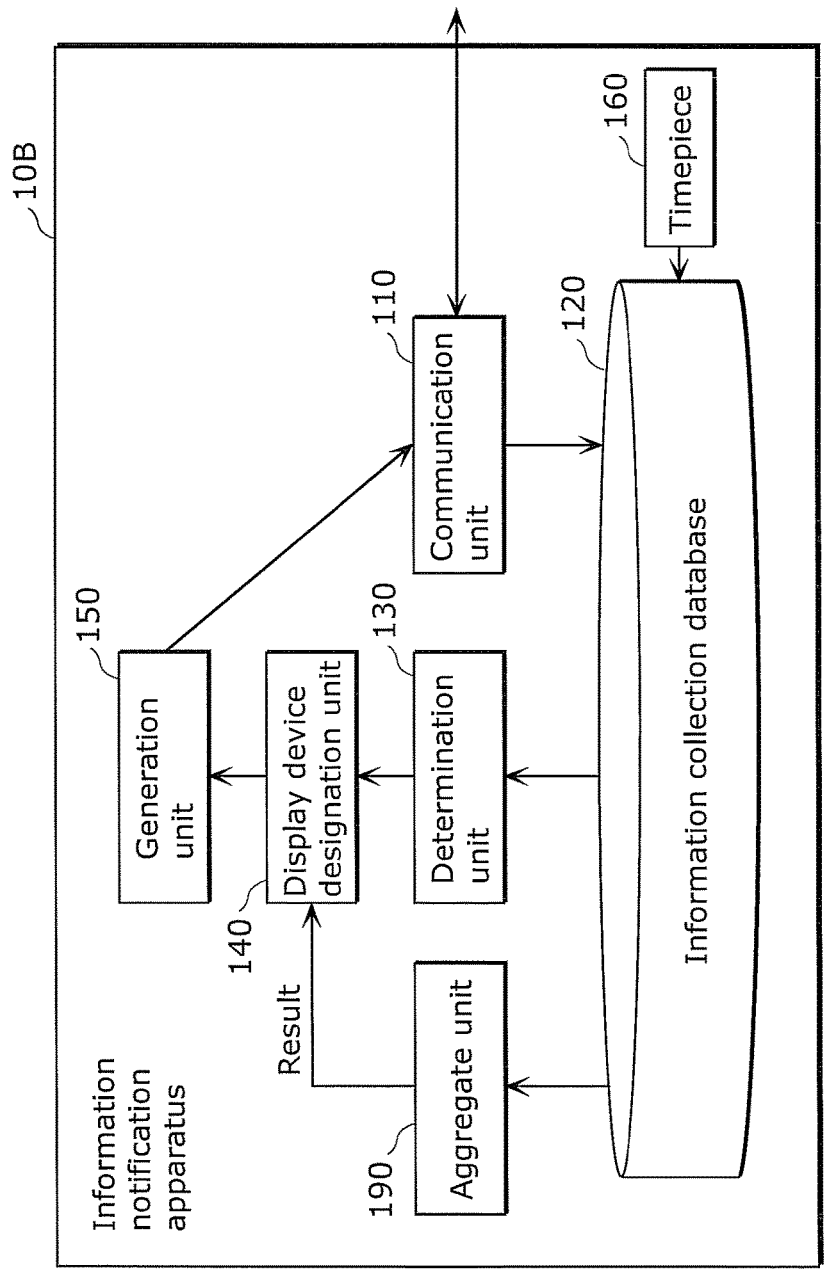
FIG. 30 is a block diagram illustrating a functional configuration of an information notification apparatus to set for allowing a display device frequently designated in the general public.

FIG. 30 is a block diagram illustrating a functional configuration of an information notification apparatus 10B to set for allowing a display device frequently designated in the general public. The same reference signs are assigned to the same elements as those in FIG. 5, and a description will be omitted thereof. The difference of an information notification apparatus 10B illustrated in FIG. 30 from the information notification apparatus 10 illustrated in FIG. 5 is the inclusion of an aggregate unit 190.

The aggregate unit 190 counts the held (registered) devices and display devices, using information held (recorded) in the information collection database 120, and convey the result to the display device designation unit 140.

The display device designation unit 140 designates, based on the conveyed result, not only the display device set by the user but also a combination of the frequently selected display devices.

In this way, the information notification apparatus 10B counts the held (registered) devices and display devices, using information held (recorded) in the information collection database 120, and the aggregate is applied to a combination of the high rankings. With this, notification can be displayed on not only the display device set by the user but also the display devices applied as a combination of the high rankings.

9) In each of the embodiments, when the user watches notification for the device on the screen of one display device designated in the destination information, notification for another device may be displayed to be superimposed on the notification for the one display device.

The example of this case will be described with reference to FIGS. 31A to 31C.

Figure 31A:
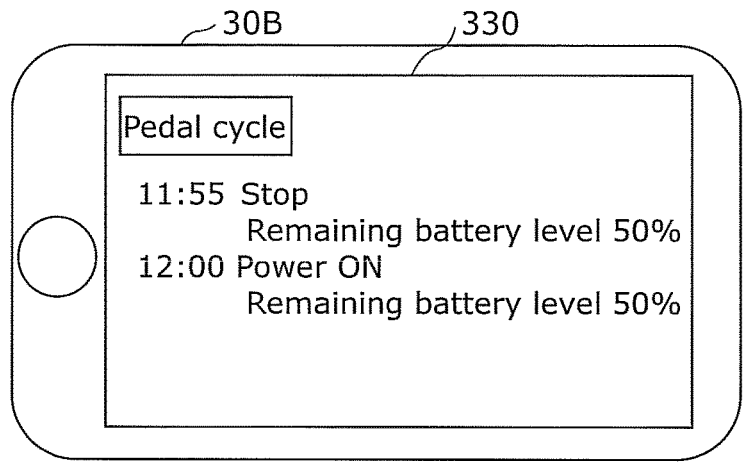
FIG. 31A is a diagram illustrating an example of a display screen on which information indicating a display device displaying notification is displayed.
Figure 31B:
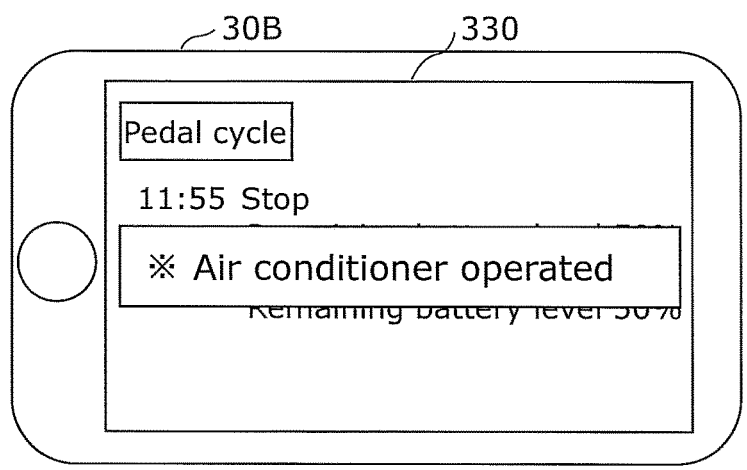
FIG. 31B is a diagram illustrating an example of a display screen on which information indicating a display device displaying notification is displayed.
Figure 31C:
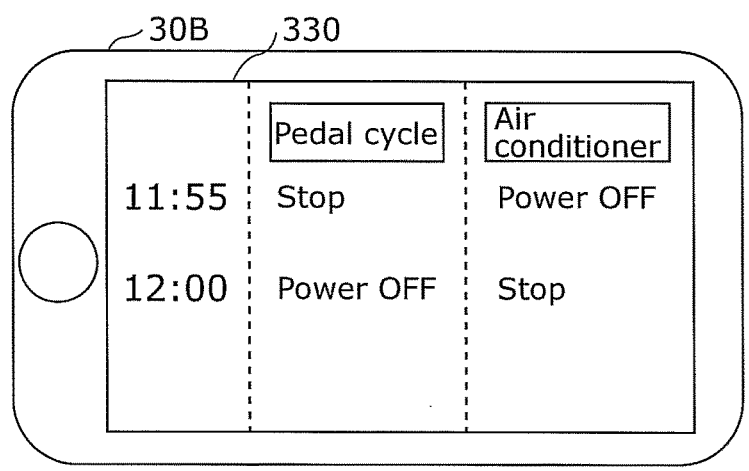
FIG. 31C is a diagram illustrating another example of a display screen on which information indicating a display device displaying notification is displayed.

FIGS. 31A and 31B are each a diagram illustrating an example of a display screen in which information indicating a display device displaying notification is displayed. In other words, in the example illustrated in FIG. 31A, the user is checking notification for the electrically assisted pedal cycle on the display unit 330 of the smart phone that is the display device 30B. Then, as illustrated in FIG. 31B, notification that the air conditioner operated is further displayed.

With this, when notification for the other device is displayed to be superimposed, it is possible to decrease the number of the case where the user misses notification.

It should be noted that the aspect of the display in which notification is displayed simultaneously with the screen of one display device designated by destination information is not limited to the above described aspect. The notification items may be displayed simultaneously in parallel as illustrated in FIG. 31C. Here, FIG. 31C is a diagram illustrating another example of a display screen in which information indicating a display device displaying notification is displayed.

10) Moreover, in each of the above described Embodiments, when the user is watching the screen of a display device but the display device is not designated in destination information, the information indicating the display device displaying notification may be displayed. The following will describe the example of this case.

Figure 32:
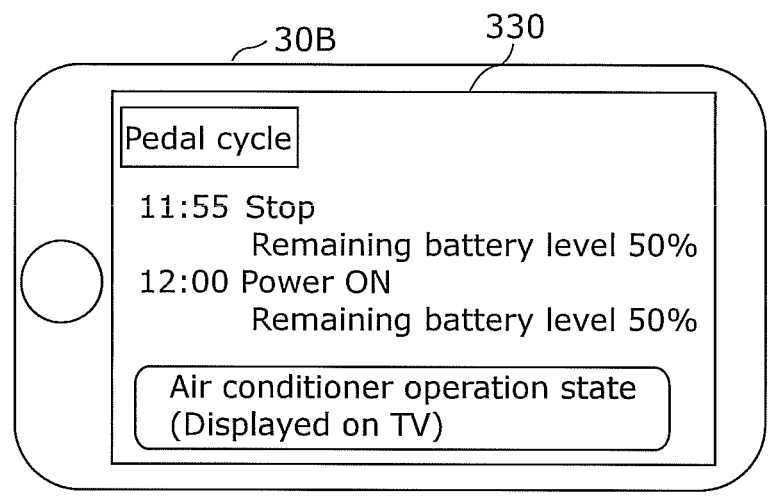
FIG. 32 is a diagram illustrating an example of a display screen on which information indicating a display device displaying notification is displayed.

FIG. 32 is a diagram illustrating an example of a display screen in which information indicating a display device displaying notification is displayed. In the example illustrated in FIG. 32, when the user is checking history information of the electrically assisted pedal cycle or notification for the electrically assisted pedal cycle on the display unit 330 (display screen) of the display device 30B that is the smartphone, notification indicating that the operation state of the air conditioner is displayed on the television is displayed on the display unit 330.

As described above, the information indicating that notification is displayed in the display device designated in destination information may be displayed on the display unit 330 of the display device 30 that is different from the designated display device. In other words, the information notification apparatus 10 and the like may transmit notification to the display device designated in destination information, and transmit sub information of the notification to the display device that is different from the designated display device and then may cause the display device to display the sub information.

11) Moreover, in each of the above described Embodiments, when there is a display device which causes an error in the display device designated in destination information, it is acceptable to display the error message on the display screen of the display device. The following will describe the example of this case.

Figure 33:
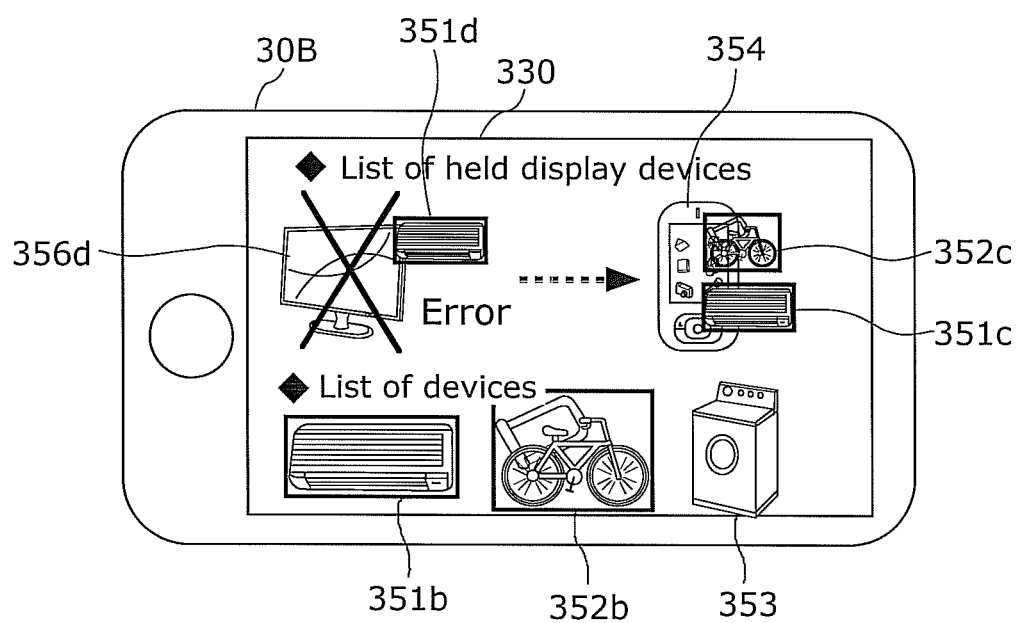
FIG. 33 is a diagram illustrating an example of a display screen in which an error occurs in a display device.

FIG. 33 is a diagram illustrating an example of a display screen in which the message that an error occurs in a display device is displayed. The same reference signs are assigned to the same elements as those in FIG. 28, and a description will be omitted thereof.

In the example illustrated in FIG. 33, when notification cannot be displayed on the television (or cannot be transmitted to the television) because the television that is one of the display devices is not turned ON, an icon 356*d* indicating the television that is an error is displayed on the display unit 330 of the display device 30B that is the smartphone. Here, as obvious from the fact that a small icon 351*d* indicating the air conditioner is near the icon 356*d* of the television that is an error, the television is designated as the display device which displays notification for the air conditioner.

In this case, the display device different from the television displays notification. In other words, in the example illustrated in FIG. 33, as obvious from the fact that the small icon 351*c* indicating the air conditioner is near the icon 354 indicating the smartphone, notification is displayed on the smartphone as a different display device.

As described above, as a method for displaying notification when an error occurs in the display device, notification may be set to be displayed on the display device in a descending order of priority as the display device different from the designated display device.

It should be noted that how to determine the priority of the different display device may be designated by the user, may be designated by the providing side (maker), and may be designated in an order starting from the same device as that having the latest operation. Moreover, set values registered in the information collection database 102 may be displayed in a descending order, and the devices set by the person having the same family structure as that of the user may be displayed from a descending order.

12) Moreover, in each of the above described Embodiments, the information notification apparatus may not display notification based on the life pattern of the user. For example, the determination unit of the information notification apparatus determines, from the history information of the device such as illumination device, the wakeup time and bedtime of the user, and then estimates the life pattern of the user. Then the determination unit may determine that it is not necessary to generate notification in a time period when the user is believed to be sleeping, and may not transmit notification to the display device.

Here, the determination unit can estimate the life pattern of the user, by determining, as the bedtime, average value obtained by aggregating the times when the illumination devices are turned off from the history information of illumination for a month, for example. Moreover, the determination unit can estimate, the user bedtime, from the history information of illumination, the time when all the illumination devices are turned off at 10 p.m. or later, for example.

For example, based on the history information of the air conditioner, the determination unit may not transmit notification to the display device when the determination unit can determine that the user is sleeping from sensor information of the air conditioner. For example, based on the history information of the air conditioner, the determination unit may not transmit notification to the display device when the determination unit checks a detection result of a human movement from human detection sensor of the air conditioner and the determination unit can determine that the user is sleeping. It should be noted that based on a detection result (value) of the human detection sensor, the determination unit can estimate the bedtime of the user by comparing the detection value with the usual life pattern of the user. Needless to say, not only the bedtime but also the wakeup time can be estimated in the same manner.

The following will describe an example of the display device in this case.

Figure 34:
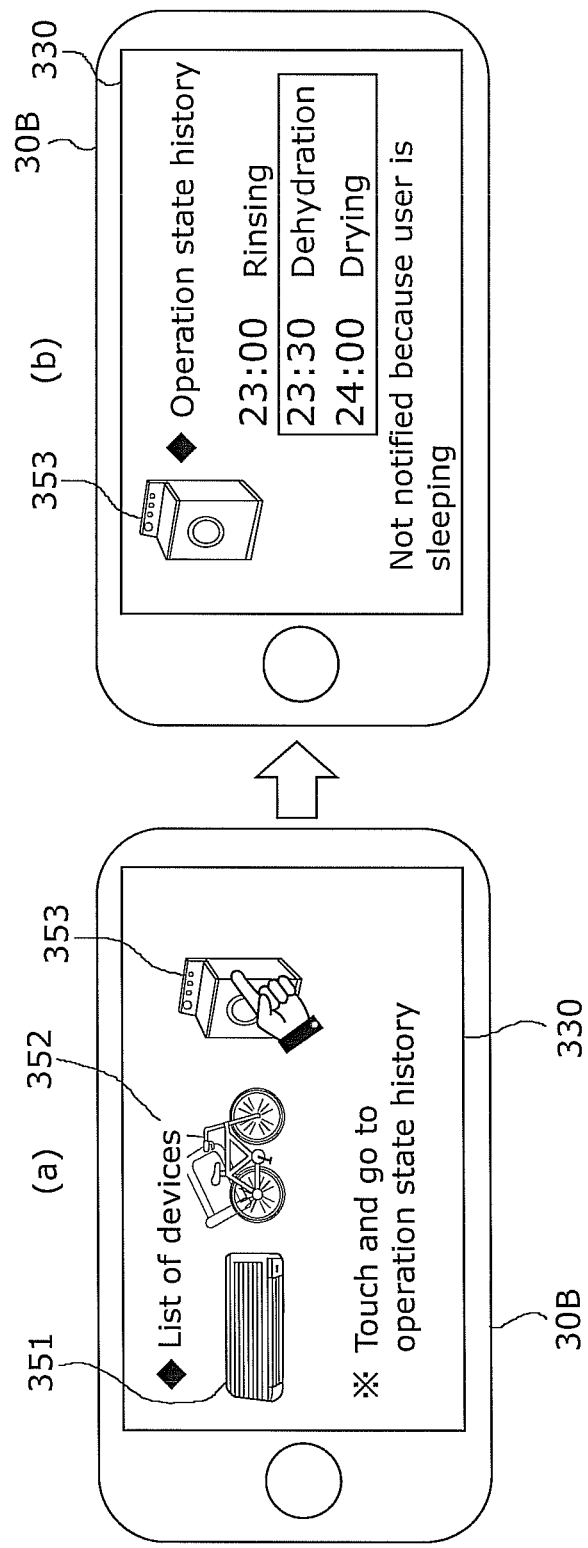
FIG. 34 is a diagram illustrating an example of a display screen of a display device when notification is not displayed based on a user life pattern.

FIG. 34 is a diagram illustrating an example of a display screen of a display device when notification is not displayed based on a user life pattern. The same reference signs are assigned to the same elements as those in FIG. 28, and a description will be omitted thereof.

As illustrated in (a) in FIG. 34, the user touches the icon 353 indicating the washing machine displayed on the display unit 330 of the smartphone that is the display device 30B, and then checks the operation state history. Then, as illustrated in (b) in FIG. 34, the operation state history last night (notification of the washing machine that is not displayed) is displayed on the display unit 330. Here, the display unit 330 also displays that the notification was not transmitted (non-notification) because the user was sleeping.

Figure 35:
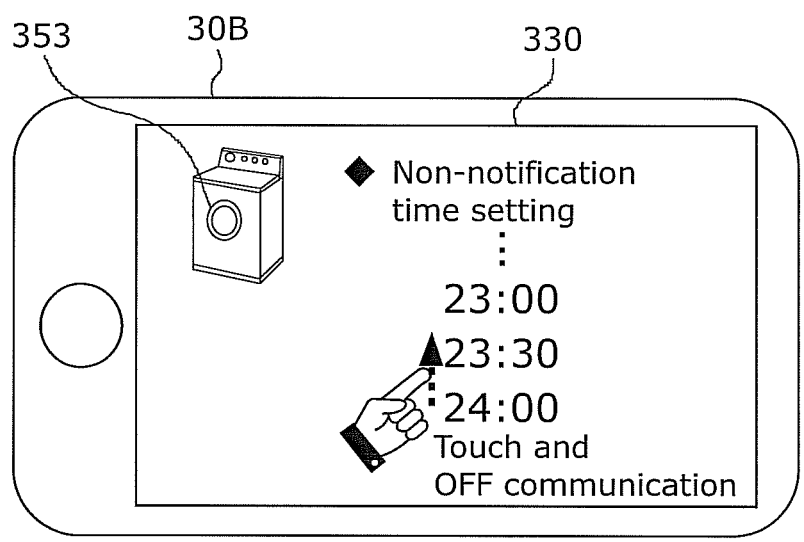
FIG. 35 is a diagram illustrating an example of a display screen which allows for setting a time period when notification is not displayed.

It should be noted that the information notification apparatus may be set to determine that the use is sleeping and therefore does not transmit notification. However, as illustrated in FIG. 35, the user may previously set a time period when the information notification apparatus does not transmit notification. FIG. 35 is a diagram illustrating an example of a display screen which allows for setting a time period when notification is not displayed. In other words, as illustrated in FIG. 35, the user may set, on the display unit 330 (display screen) of the display device 30B that is the smartphone, a time period when notification is not transmitted (non-notification time).

13) Moreover, in each of the above described Embodiments, when transmitting notification to the display device designated by the display device designation unit, the information notification apparatus may remind (alert) the user that notification is displayed on the designated display device, by flashing illumination or a light of the device.

Figure 36:
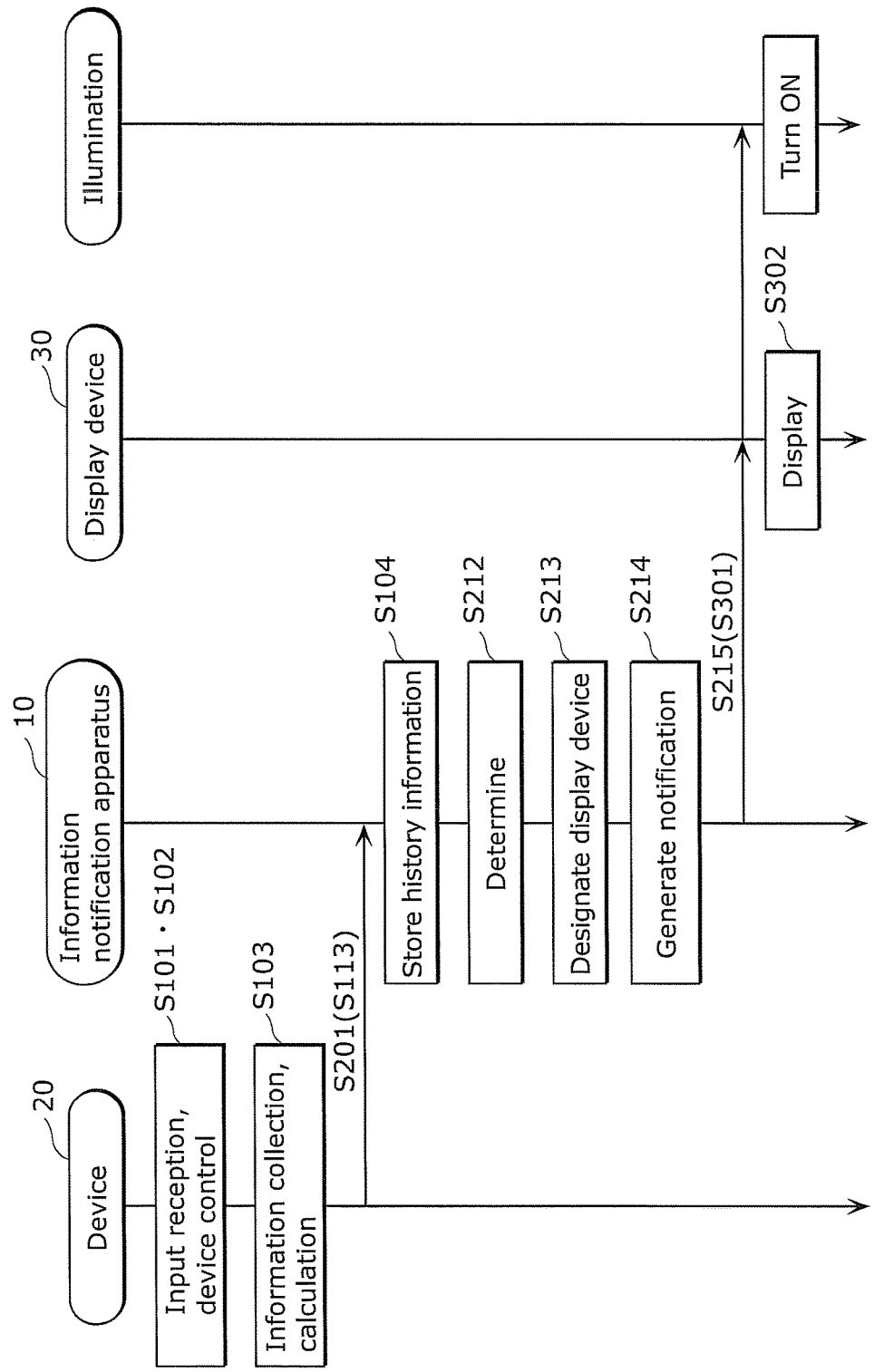
FIG. 36 is a sequence diagram illustrating a flow of operations in a device, a display device, an information notification apparatus, and an illumination device.

The sequence diagram will be illustrated in FIG. 36. FIG. 36 is a sequence diagram illustrating a flow of operations in a device, a display device, an information notification apparatus, and an illumination lamp. The same reference signs are assigned to the same elements as those in FIG. 12A, and a description will be omitted thereof.

In FIG. 36, when transmitting notification to the display device designated by the display device designation unit, the information notification apparatus 10 also simultaneously transmits a control signal which controls a lighting portion of the device having an illumination device, a light, or the like. On receipt of the control signal, the device having a lighting portion operates the lighting portion of the device according to the control signal. As described above, with the lighting portion such as flashes of the light or illumination device, it is possible to alert the user that notification is displayed on the designated display device such as the smartphone.

It should be noted that the display device is not limited to the smartphone. Moreover, the operation of the lighting portion may be stopped when an action against notification of the user can be detected.

Moreover, when the lighting portion is a light of the device, the content of notification and the difference between the display devices on which notification is displayed may be indicated with the light color and lighting interval.

Moreover, a method for alerting the user may be performed using not only light but also sound. In that case, the content of notification and the difference between the display devices on which notification is displayed may be indicated with a tone or an interval. Furthermore, the tone color or sound for alerting the user may be freely set by the user, and may be set based on the aggregate result of the set values of all the users including other users.

Although the information notification apparatus and the method for controlling the information notification apparatus according to one of more aspects have been described based on the embodiments, the present invention is not limited to the embodiments. Although only some exemplary embodiments have been described in detail above, those skilled in the art will readily appreciate that various modifications may be made in these exemplary embodiments without materially departing from the principles and spirit of the inventive concept, the scope of which is defined in the appended Claims and their equivalents.

It should be noted that the techniques described in the above aspects can be implemented in the following cloud service types. However, the types to be implemented in the above aspects are not limited to these.

(Service Type 1: Own Data Center Type)

Figure 37:
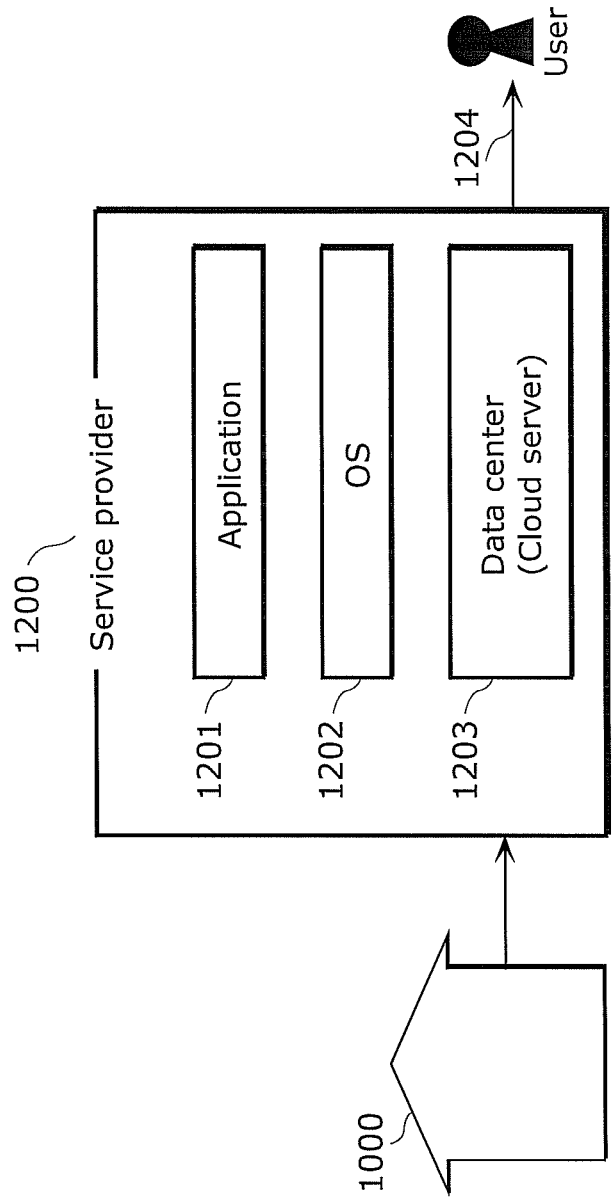
FIG. 37 is a diagram illustrating a service type 1 (own data center type).

FIG. 37 is a diagram illustrating a service type 1 (own data center type).

The type is a type that a service provider 1200 obtains information from the group 1000, and provides the service to the user. In the type, the service provider 1200 has the function of the data center operator. In other words, the service provider 1200 holds the cloud server 1110 which manages big data. Therefore, there is no data center operator.

In this type, the service provider 1200 operates and manages the data center (cloud server 1110) (1203). Moreover, the service provider 1200 manages OS (1202) and application (1201). The service provider 1200 provides a service using OS (1202) and application (1201) managed by the service provider 1200 (1204).

(Service Type 2: IaaS Use Type)

Figure 38:
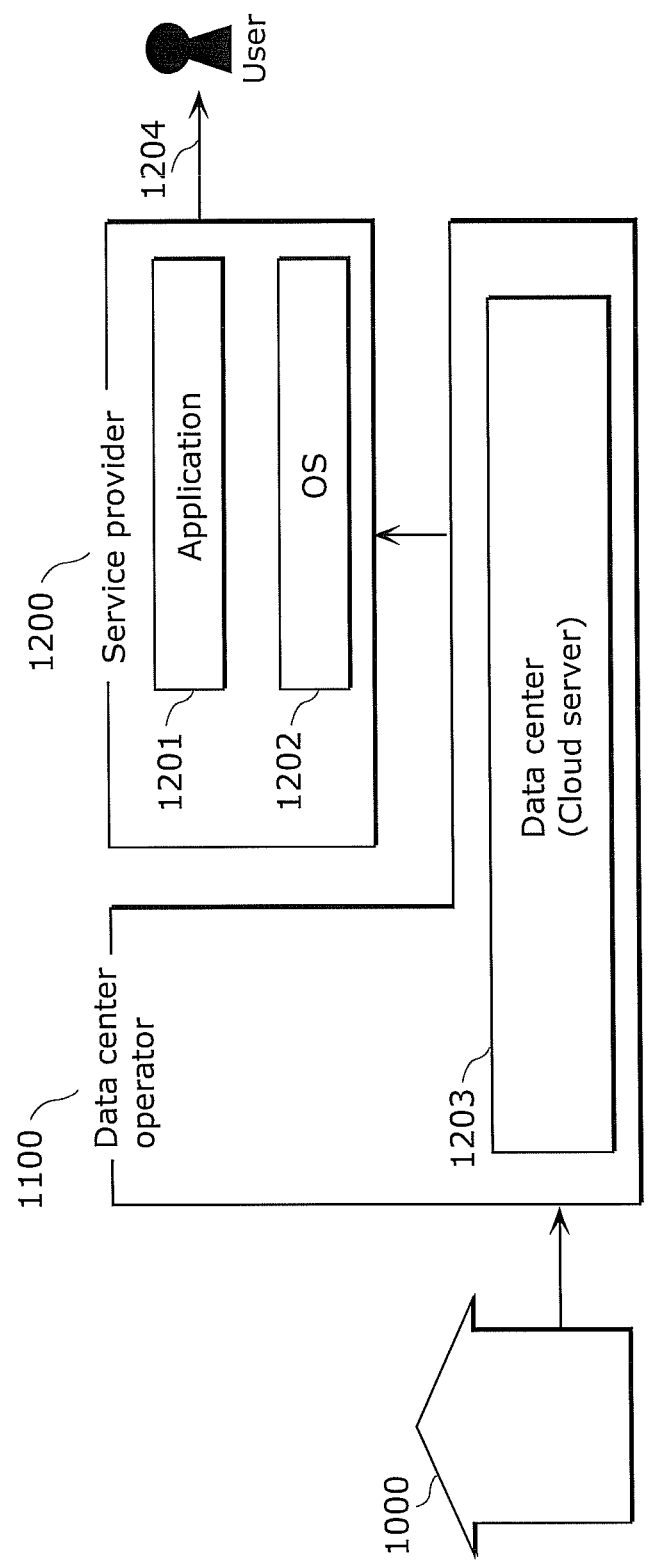
FIG. 38 is a diagram illustrating a service type 2 (IaaS use type).

FIG. 38 is a diagram illustrating a service type 2 (IaaS use type).

Here, Iaas is the abbreviation of infrastructure as a service, and a cloud service providing model in which the basis itself for constructing and operating a computer system is provided a service via the Internet.

In this type, the data center operator operates and manages the data center (cloud server 1110) (1203). Moreover, the service provider 1200 manages OS (1202) and application (1201). The service provider 1200 provides a service using OS (1202) application (1201) managed by the service provider 1200 (1204).

(Service Type 3: PaaS Use Type)

Figure 39:
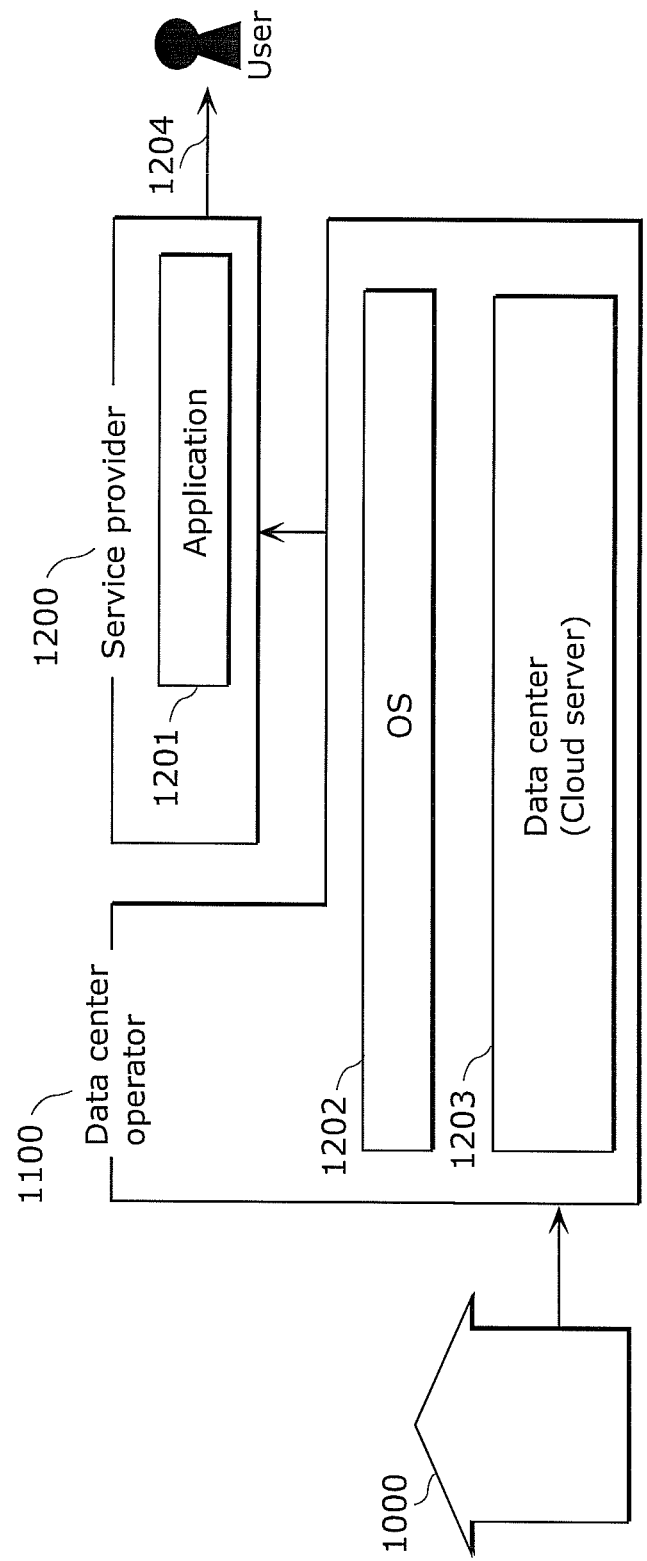
FIG. 39 is a diagram illustrating a service type 3 (PaaS use type).

FIG. 39 is a diagram illustrating a service type 3 (PaaS use type).

Here, PaaS is the abbreviation of platform as a service, and a cloud service providing model in which the platform serving as the basis for constructing and operating software is provided a service via the Internet.

In this type, the data center operator 1100 manages OS (1202), and operates and manages the data center (cloud server 1110) (1203). Moreover, the service provider 1200 manages application (1201). The service provider 1200 provides a service using OS (1202) managed by the data center operator and application (1201) managed by the service provider 1200 (1204).

(Service Type 4: SaaS Use Type)

Figure 40:
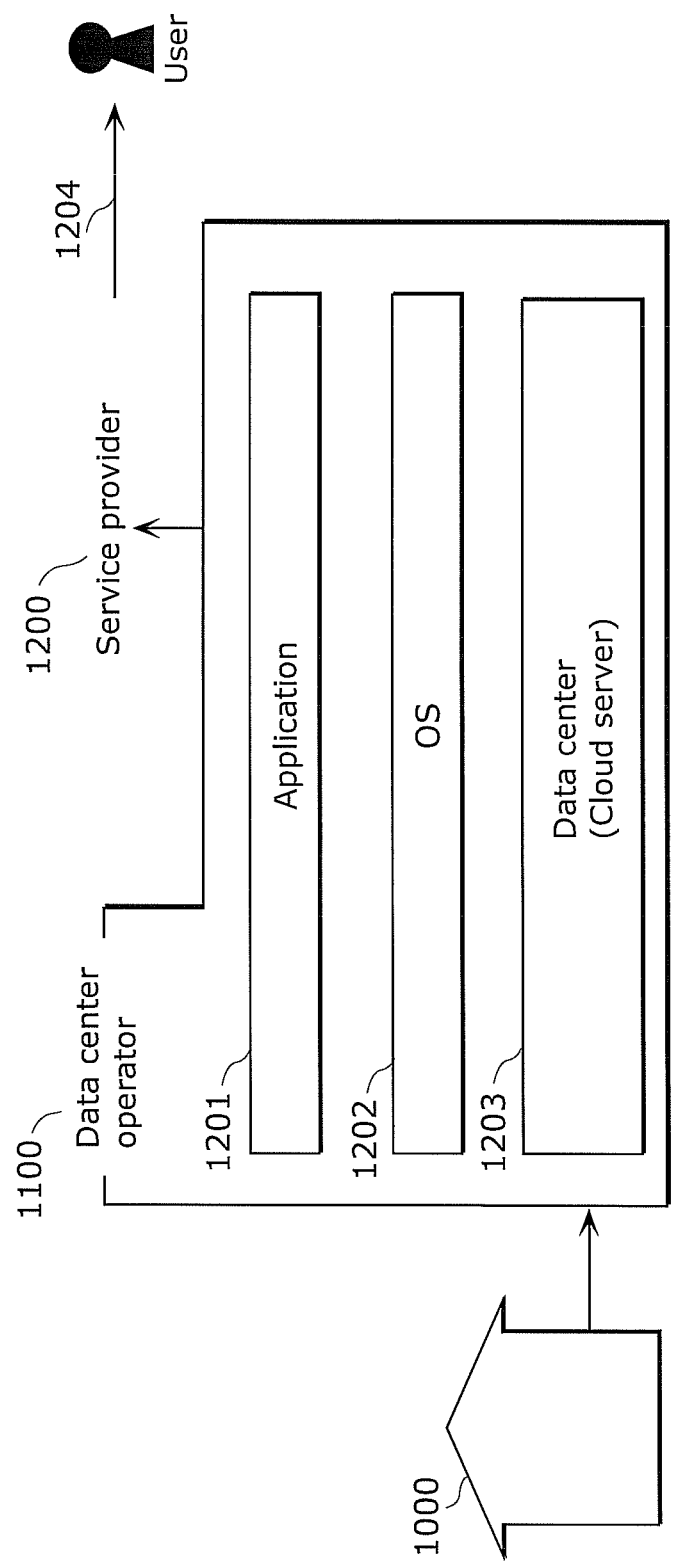
FIG. 40 is a diagram illustrating a service type 4 (SaaS use type)

FIG. 40 is a diagram illustrating a service type 4 (SaaS utilization type).

Here, SaaS is the abbreviation of software as a service. For example, this is a cloud service providing model, for example, having the function of allowing a company or an individual (user) without the data center (cloud server) to use application provided by a platform provider owning the data center (cloud server) via a network such as the Internet.

In this type, the data center operator 1100 manages application (1201), manages OS (1202), and operates and manages the data center (cloud server 1110) (1203). The service provider 1200 provides a service using OS (1202) and application (1201) managed by the data center operator 1100 (1204).

As described above, in any types, the service provider 1200 provides the service. Moreover, for example, the service provider or the data center operator may develop by itself OS, application, or database of big data, and outsource the development to the outside sources.

INDUSTRIAL APPLICABILITY

The present invention is applicable to an information notification apparatus which transmits notification of the networked devices.

REFERENCE SIGNS LIST 10, 10B, 11, 12, 13, 14 Information notification apparatus
20, 20A, 1010 Device
30, 30A, 30B, 31 Display device
Network
50, 50A External terminal
110, 111, 112, 250, 310, 311 Communication unit
120 Information collection database
130, 131, 132 Determination unit
140, 141 Display device designation unit
150, 151 Generation unit
160, 260 Timepiece
170, 171 Position information identification unit
180 Pattern extraction unit
190 Aggregate unit
210 Power source unit
220, 340 Input unit
230, 320, 321 Control unit
240 Storage unit
330, 331 Display unit
351, 351c, 351d, 352, 352c, 353, 354, 356, 356d, 454 Icon
1000 Group
1020 Home gateway
1100 Data center operator
1110 Cloud server
1200 Service provider
1210 Server

The invention claimed is:

1. An information notification apparatus comprising:
a processor; and
a non-transitory computer-readable medium having stored thereon executable instructions that, when executed by the processor, cause the information notification apparatus to function as:
a communication unit configured to receive, from each of a plurality of devices which operate on receipt of an input from a user, a device information item uniquely identifying the each of the plurality of devices, and history information of the plurality of devices, the history information including at least one of (i) a control information item for the each of the plurality of devices and (ii) a state information item indicating a state for the each of the plurality of devices, the plurality of devices including at least one of a household electrical appliance, an illumination device, and a vehicle;

an information collection database which holds, in association with each other, an information item of the user owning the each of the plurality of devices, the device information item for the each of the plurality of devices, and the history information of the plurality of devices received by the communication unit;

a determination unit configured to determine that it is necessary to transmit notification of a first device when information held in the information collection database satisfies a predetermined condition, the first device being one of the plurality of devices;

a position information identification unit configured to identify, by referring to the control information item included in the history information of the plurality of devices held in the information collection database, a second device having history information including a time information item closest to current time among the plurality of devices;

a display device designation unit configured to designate, when the determination unit determines that it is necessary to transmit the notification of the first device, the second device as a display device to which the notification of the first device is to be transmitted, when the second device identified by the position information identification unit has a display function; and a generation unit configured to generate the notification when the determination unit determines that it is necessary to transmit the notification of the first device, wherein the communication unit is further configured to transmit the generated notification to the second device designated by the display device designation unit.

2. The information notification apparatus according to claim 1, wherein the display device designation unit is configured to:

when the second device identified by the position information identification unit has a display function, designate the identified second device as the display device; and when the second device identified by the position information identification unit does not have a display function, designate another device as the display device.

3. The information notification apparatus according to claim 1, wherein the history information received by the communication unit includes a time information item indicating time about the at least one of (i) the control information item for the each of the plurality of devices and (ii) the state information item indicating the state for the each of the plurality of devices.

4. The information notification apparatus according to claim 1, further comprising a timepiece capable of obtaining a time information item, wherein the information collection database obtains, from the timepiece, a time information item indicating time when the communication unit received the history information, when a time information item is not included in the history information received by the communication unit, and holds, in association with each other, the history information and the obtained time information item.

5. The information notification apparatus according to claim 1, wherein the position information identification unit is further configured to identify a position of the user, wherein the determination unit is configured to determine that it is necessary to transmit the notification of the first device when (i) information included in the history information held in the information collection database satisfies a predetermined condition and (ii) the identified position of the user is a position previously determined as the position in which the user is capable of responding to the notification.

6. The information notification apparatus according to claim 5, wherein the position of the user is identified using information from a global positioning system (GPS) included in a terminal owned by the user.

7. The information notification apparatus according to claim 5, wherein when the first device is an electrically assisted pedal cycle,
   (i) the determination unit is configured to determine that it is necessary to transmit the notification to the user when the position information identification unit identifies that the user is at home, and
   (ii) the generation unit is configured to generate, as the notification, information about a remaining battery level of the electrically assisted pedal cycle.

8. The information notification apparatus according to claim 5, wherein when the first device is an air conditioner,
   (i) the determination unit is configured to determine that it is necessary to transmit the notification to the user when the position information identification unit identifies that the user is not at home, and
   (ii) the generation unit is configured to generate, as the notification, information notifying that the air conditioner is operating.

9. The information notification apparatus according to claim 1, wherein the executable instructions, when executed by the processor, cause the information notification apparatus to further function as a pattern extraction unit configured to extract a use pattern when the user uses the first device, by referring to the history information held in the information collection database, wherein the determination unit is further configured to determine that it is necessary to transmit the notification which encourages use of the first device indicated by the use pattern when determining, from the history information, that the first device indicated by the use pattern extracted by the pattern extraction unit is not used, the generation unit is configured to generate the notification which encourages use of the first device, and the communication unit is configured to transmit the generated notification to the display device designated by the display device designation unit.

10. The information notification apparatus according to claim 1, wherein:

the information included in the history information is a value indicating a remaining battery level of the first device when the first device is an electrically assisted pedal cycle; and the predetermined condition indicates whether or not the remaining battery level is no more than a predetermined value indicating a level necessary to recharge the first device.

11. The information notification apparatus according to claim 1, wherein the display device designation unit is configured to designate the second device among the plurality of devices, based on information about whether or not power is ON, in the history information.

12. The information notification apparatus according to claim 1, wherein the display device designation unit is further configured to designate the second device, based on history of being associated with a device which displays information about the first device in the past.

13. The information notification apparatus according to claim 1, wherein the display device designation unit is configured to designate another device as the second device, based on history of being associated with a device which displays information about the first device in the past, when the second device causes an error after being designated as a device on which the notification of the first device among the plurality of display devices is to be displayed, based on history information of the plurality of devices held in the information collection database.

14. The information notification apparatus according to claim 1, wherein:
the generation unit is configured to generate information which encourages control of the first device, along with the notification; and
the communication unit is configured to transmit information which encourages control of the first device, along with the notification.

15. The information notification apparatus according to claim 14, wherein:
the generation unit is further configured to generate a control command of the first device; and
the communication unit is further configured to transmit an operation command to control the first device, based on the control command.

16. The information notification apparatus according to claim 1, wherein the communication unit is configured to transmit, to the second device or another device, information alerting that notification is displayed on the second device.

17. The information notification apparatus according to claim 16, wherein the other device is an illumination device, and the alerting information is information that the illumination device is turned ON.

* * * * *